(12) United States Patent
Damstra et al.

(10) Patent No.: US 12,433,776 B2
(45) Date of Patent: Oct. 7, 2025

(54) CUSTOMIZED WEARABLE WITH INTEGRATED PATHWAYS AND/OR INTERCONNECTS

(71) Applicant: Aspen Medical Products, LLC, Irvine, CA (US)

(72) Inventors: Robert Matthew Damstra, Lake Forest, CA (US); Albert V. Romo, Lakewood, CA (US); Joel Perez, Long Beach, CA (US); Harry Duane Romo, Pahrump, NV (US)

(73) Assignee: Aspen Medical Products, LLC, Irvine, CA (US)

( * ) Notice: Subject to any disclaimer, the term of this patent is extended or adjusted under 35 U.S.C. 154(b) by 202 days.

(21) Appl. No.: 18/448,922

(22) Filed: Aug. 12, 2023

(65) Prior Publication Data
US 2025/0049603 A1 Feb. 13, 2025

(51) Int. Cl.
*A61F 5/00* (2006.01)
*A61F 5/01* (2006.01)

(52) U.S. Cl.
CPC .................. *A61F 5/0104* (2013.01)

(58) Field of Classification Search
None
See application file for complete search history.

(56) References Cited

U.S. PATENT DOCUMENTS

| | | | |
|---|---|---|---|
| 3,286,277 A | 11/1966 | Weiss | |
| 4,240,415 A | 12/1980 | Wartman | |
| 4,483,333 A | 11/1984 | Wartman | |
| 4,745,912 A | 5/1988 | McMurray | |
| 6,093,161 A | 7/2000 | Maeyen et al. | |

(Continued)

FOREIGN PATENT DOCUMENTS

| | | |
|---|---|---|
| CN | 1190177 C | 2/2005 |
| CN | 214128973 U | 9/2021 |

(Continued)

OTHER PUBLICATIONS

PCT/US2022/016874 filed Feb. 17, 2022 International Search Report and Wirtten Opinion dated Jul. 19, 2022.

(Continued)

*Primary Examiner* — Kim M Lewis
(74) *Attorney, Agent, or Firm* — Rutan & Tucker, LLP

(57) ABSTRACT

One embodiment relates to an orthopedic precast that, upon an application of heat of a prescribed level while the orthopedic precast is worn adjacent to a targeted body part of the patient, transitions into an orthosis that conforms with the body part. The orthopedic precast includes a first portion and an interconnect. The first portion is formed of interwoven strands of a first thermoplastic material having a first melting temperature. These interwoven strands forming a pathway within the first portion. The interconnect is positioned within the pathway, wherein the interconnect is configured to receive power and radiate heat based on current flowing through the interconnect. Responsive to the interconnect supplying radiating heat of at least the first melting temperature, the first thermoplastic material partially melts and, upon subsequent cooling, the first portion transitions from flexible material into a rigid structure of the orthosis.

20 Claims, 12 Drawing Sheets

(56) References Cited

U.S. PATENT DOCUMENTS

| | | |
|---|---|---|
| 6,267,743 B1 | 7/2001 | Bodenschatz et al. |
| 7,905,848 B2 | 3/2011 | Cuypers et al. |
| 8,303,527 B2 | 11/2012 | Joseph |
| 8,480,604 B2 | 7/2013 | Messer |
| 8,959,959 B1 | 2/2015 | Podhajny |
| 9,295,575 B1 | 3/2016 | Dignam et al. |
| 9,452,073 B2 | 9/2016 | Cuypers et al. |
| 9,572,703 B2 | 2/2017 | Matthews |
| 10,081,889 B2 | 9/2018 | Cuypers et al. |
| 10,343,309 B2 | 7/2019 | Cuypers et al. |
| 10,750,826 B2 | 8/2020 | Meythaler et al. |
| 10,765,773 B2 | 9/2020 | Watson |
| 10,864,099 B2 | 12/2020 | Cuypers et al. |
| 11,964,061 B2 | 4/2024 | Romo, Jr. et al. |
| 2002/0088501 A1 | 7/2002 | Bruner |
| 2002/0182961 A1 | 12/2002 | Clercq et al. |
| 2003/0224685 A1 | 12/2003 | Sharma |
| 2004/0118018 A1 | 6/2004 | Dua |
| 2006/0253960 A1 | 11/2006 | Horn et al. |
| 2010/0199520 A1 | 8/2010 | Dua et al. |
| 2012/0210488 A1 | 8/2012 | Blakely et al. |
| 2013/0025075 A1 | 1/2013 | Meschter et al. |
| 2013/0260629 A1 | 10/2013 | Dua et al. |
| 2014/0213953 A1 | 7/2014 | Heyd et al. |
| 2015/0133839 A1 | 5/2015 | Roebelt et al. |
| 2016/0286898 A1 | 10/2016 | Manz et al. |
| 2017/0079828 A1 | 3/2017 | Pedtke et al. |
| 2018/0085244 A1 | 3/2018 | Burke et al. |
| 2018/0127905 A1 | 5/2018 | Amis et al. |
| 2018/0169963 A1 | 6/2018 | Dua et al. |
| 2018/0317592 A1 | 11/2018 | Rudolf et al. |
| 2018/0332920 A1 | 11/2018 | Burch |
| 2019/0037967 A1 | 2/2019 | McFarland, II et al. |
| 2019/0208862 A1 | 7/2019 | Poegl et al. |
| 2019/0343216 A1 | 11/2019 | Huffa et al. |
| 2019/0387813 A1 | 12/2019 | Almog |
| 2020/0009288 A1 | 1/2020 | Geremtzes et al. |
| 2020/0022457 A1 | 1/2020 | Oordt et al. |
| 2020/0375317 A1 | 12/2020 | Meir |
| 2021/0030117 A1 | 2/2021 | Frazier et al. |
| 2021/0153602 A1 | 5/2021 | Polgar et al. |
| 2022/0256939 A1 | 8/2022 | Romo, Jr. et al. |
| 2022/0257824 A1* | 8/2022 | Romo, Jr. .............. D04B 1/265 |

FOREIGN PATENT DOCUMENTS

| | | |
|---|---|---|
| FR | 3018043 A1 | 9/2015 |
| GB | 1253651 A | 11/1971 |
| JP | H0370558 A | 3/1991 |
| JP | 2004313385 A | 11/2004 |
| JP | 2004339651 A | 12/2004 |
| KR | 20170017613 A | 2/2017 |
| WO | 99/62440 A1 | 12/1999 |

OTHER PUBLICATIONS

U.S. Appl. No. 17/178,071, filed Feb. 17, 2021 Non-Final Office Action dated Jul. 17, 2023.

U.S. Appl. No. 17/178,071, filed Feb. 17, 2021 Notice of Allowance dated Nov. 29, 2023.

U.S. Appl. No. 17/178,071, filed Feb. 17, 2021 Restriction Requirement dated Jul. 11, 2022.

U.S. Appl. No. 17/673,716, filed Feb. 16, 2022 Non-Final Office Action dated Oct. 2, 2023.

U.S. Appl. No. 17/673,716, filed Feb. 16, 2022 Restriction Requirement dated Mar. 31, 2023.

U.S. Appl. No. 17/673,716, filed Feb. 16, 2022 Final Office Action dated Sep. 29, 2024.

U.S. Appl. No. 17/673,716, filed Feb. 16, 2022 Restriction Requirement dated Apr. 24, 2024.

EP 22756965.4 filed Sep. 18, 2023 Extended European Search Report dated Dec. 12, 2024.

PCT/US2024/041849 filed Aug. 11, 2024 International Search Report and Written Opinion dated Dec. 4, 2024.

PCT/US2024/041849 filed Aug. 11, 2024 International Search Report and Written Opinion dated Jan. 13, 2025.

PCT/US2024/041851 filed Aug. 11, 2024, International Search Report and Written Opinion dated Dec. 17, 2024.

* cited by examiner

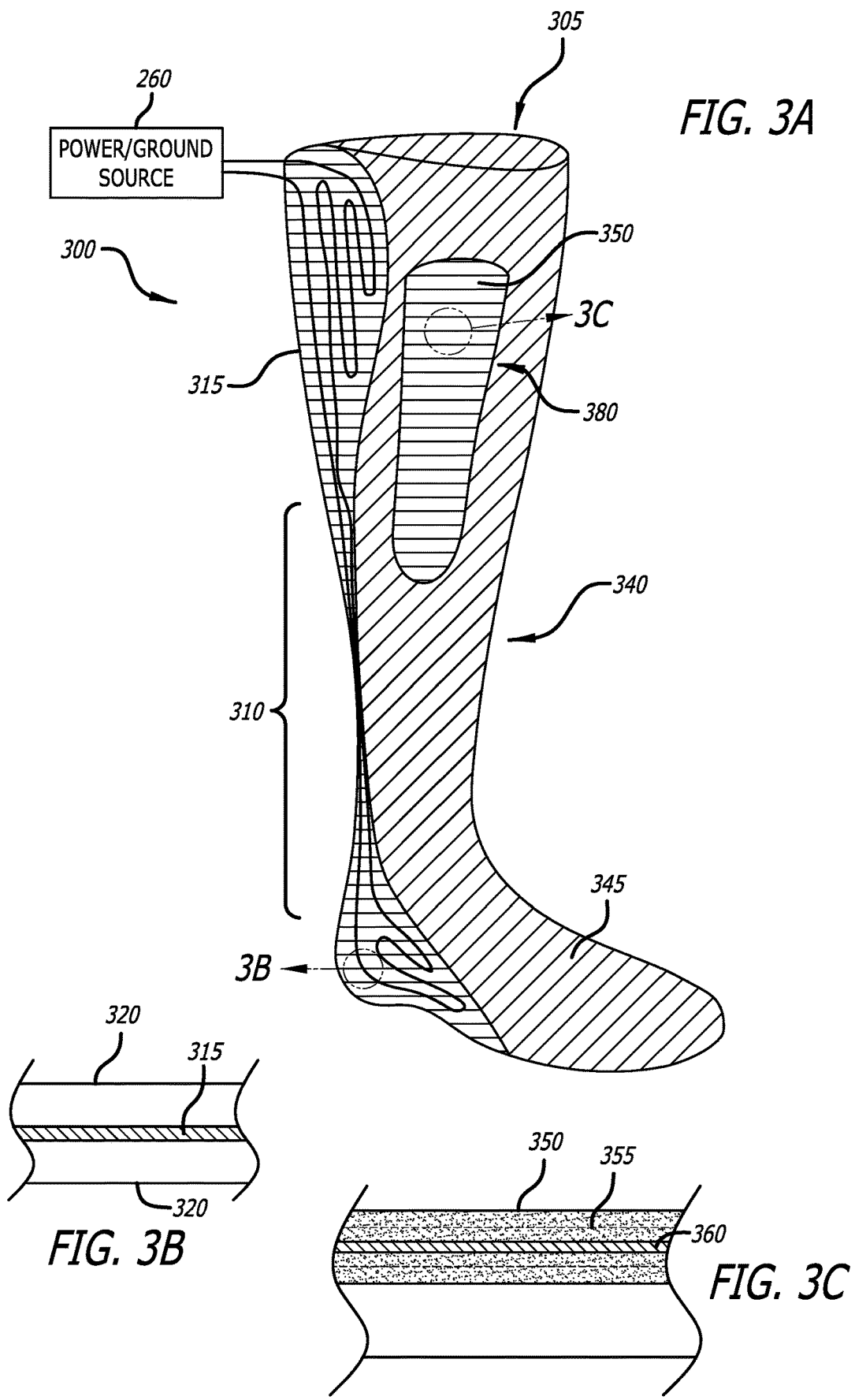

CUSTOMIZED WEARABLE WITH INTEGRATED PATHWAYS AND/OR INTERCONNECTS

FIELD

Embodiments of the disclosure relate to an orthopedic precast with pathways adapted to receive or integrated with an interconnect operating as a conductive element that, when activated, causes thermoplastic material within the wearable to undergo a phase change from a flexible-to-rigid material to generate the customized orthosis.

BACKGROUND

The following description includes information that may be useful in understanding the present invention. It is not an admission that any of the information provided herein is prior art or relevant to the presently claimed invention, or that any publication specifically or implicitly referenced is prior art.

Orthopedic braces (orthoses) usually need to be adjusted or customized in some manner to conform to the body part(s) being braced. A typical orthosis commonly has at least two portions, a rigid portion operating as a support structure and a flexible portion securing the orthosis to the body. The flexible portion often involve a strap, and in many orthoses, multiple straps are required to adequately secure the orthosis. It can be time-consuming for a patient to repeatedly have to adjust the different straps.

Custom orthoses have been made from a combination of resilient and flexible materials. For example, U.S. Pat. No. 9,572,703 to Matthews describes an orthosis sock that utilizes a resilient material for restricting movement of a patient's foot. While the orthosis is easier to wear than a typical ankle-foot-orthosis (AFO), the material forming the orthosis is not resilient and is insufficient to provide adequate support. The stitching of material to provide necessary resiliency is both labor intensive and susceptible to potentially uncomfortable areas at the stitching points.

Currently, custom orthoses are formed by creating a negative mold of a patient's lower leg, ankle, and foot, using the negative mold to create a positive mold, wrapping preheated flexible and hardenable materials about different portions of the positive mold, and then applying vacuum to the material-wrapped positive mold then allowing time for the materials to cool to the shape of the positive mold. Once cooled, the materials must be carefully cut off the mold then all cut edges must be ground/smoothed to the final shape. Production of such custom orthoses, especially an orthosis configured to retain concealed wires or cables within the orthosis, requires considerable skill, and is therefore relatively expensive. Moreover, the production of an orthosis becomes more complex when pathways are relied upon for activation of thermoplastic material for customizing the rigidity of certain regions of the orthosis.

An orthopedic precast for the generation of customized orthoses formed by interwoven portions of material to form pockets, recessed areas, and channels for retention of conductive interconnects involved in the customization process is needed.

BRIEF DESCRIPTION OF THE DRAWINGS

FIG. 3A is a perspective view of an exemplary embodiment of orthopedic precast of a leg-ankle-foot orthosis (AFO).

FIG. 3B is a cross-sectional view of a segment of the first interwoven portion featuring a pathway and an interconnect maintained within the pathway.

FIG. 3C is a cross-sectional view of a segment of an interwoven portion forming a pocket featuring a pathway and an interconnect maintained within the pathway.

DETAILED DESCRIPTION

Figure 1A:
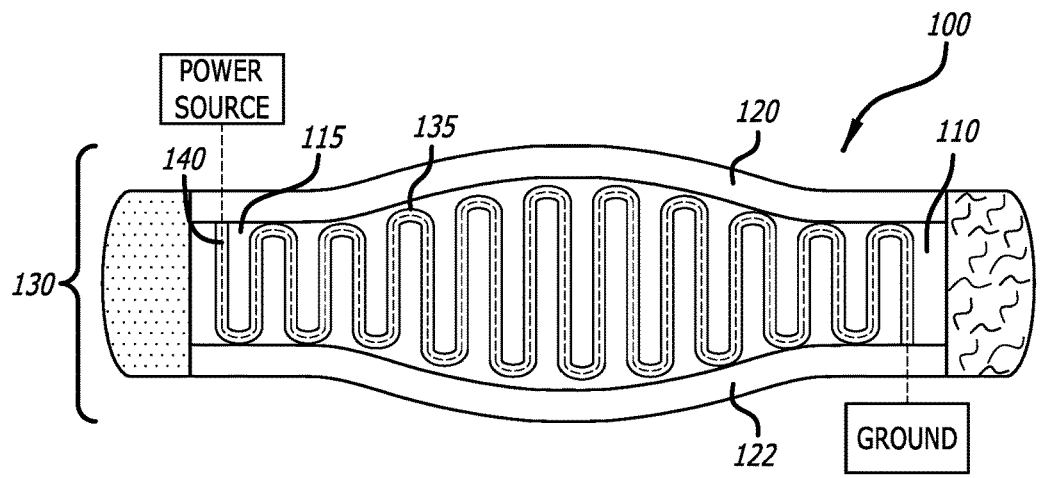
FIG. 1A is a perspective view of an exemplary embodiment of an orthopedic precast.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include any combination of A, B, C, and/or D, even if not explicitly disclosed.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

I. General Summary

Embodiments of the disclosure are directed to a customized wearable and methods in which the composition of a wearable may be structurally modified based on a prescribed amount of heat applied thereto. In particular, the wearable may be configured as an orthopedic precast in which one or more portions of the precast, in response to an application of heat at or exceeding a prescribed temperature followed by cooling, experiences a phase transition to form an orthosis (e.g., an ankle-foot-orthosis (AFO), cervical orthosis, torso orthosis, leg-ankle-foot orthosis, wrist guard, or shoulder orthosis). The application of heat to one or more portions of the orthopedic precast may cause some or all of the materials within the portion(s) to undergo a phase transition (change), namely the melting and/or bonding with other materials before solidifying after cooling.

According to one embodiment of the disclosure, the wearable may feature (i) a first portion comprising one or more interwoven strands inclusive of at least a first thermoplastic material that is coupled to (ii) a second portion comprising one or more interwoven strands inclusive of the same or different thermoplastic material and/or non-thermoplastic material. Pathways for interconnects (e.g., electrical wires, cables, straps, conduits, heating elements, etc.) may be formed within any of these interwoven portions or positioned between neighboring interwoven portions. The "pathways" may constitute one or more channels (e.g., closed channels (tubular structures), open channels (grooves), etc.), recessed regions, or any construction that can retain one or more interconnects therein.

As an illustrative example, the first interwoven portion and the second interwoven portion may be coupled together as part of a single layer construction, where these interwoven portions may utilize different material(s) and/or different interweaving techniques to provide greater rigidity, maintain a flexible and/or elastic construction, or the like. Alternatively, the first interwoven portion and/or the second interwoven portion may be layered on each other to provide additional rigidity at certain locations of the orthosis proximate to particular body parts of the patient.

According to one embodiment of the disclosure, pathways may be formed as part of the first interwoven portion, as part of the second interwoven portion, or between the first interwoven portion and the second interwoven portion. The pathways are intended to receive and partially house one or more interconnects (hereinafter, "interconnect"). When activated, according to one embodiment of the disclosure, the interconnect may operate as a heating element. More specifically, when a power source is coupled to the interconnect and power is supplied, the temperature of the interconnect may rise and radiate sufficient heat to cause one or more of the interwoven portions including or physically proximate to the interconnect to experience a phase transition. For instance, the pathways may be configured in a pattern to maintain interconnects that, when heated, cause thermoplastic material physically proximate to the interconnects to partially melt and cause the pathway to be partially filled with the melted thermoplastic material. This filling, causing a partial collapse of the pathway, creates a rigid or semi-rigid area of the orthosis in which the interconnect resides.

As an illustrative example, the activation process may involve applying power to the interconnect, which causes the interconnect to radiate heat. Once the radiated heat reaches or exceeds a prescribed thermal threshold, a first thermoplastic material, which is adjacent and/or proximate to the interconnect within the first interwoven portion, experiences a phase transition. This phase transition may involve a partial melting of the first thermoplastic material. After experiencing a phase transition, the first interwoven portion transitions from a flexible material to a rigid or semi-rigid material (referred to as a "shell portion") partially forming a resultant orthosis. Herein, different interwoven portions may experience different amounts of phase transition, depending on their material composition, structure, and the amount of heat transferred to the interwoven portion. The different amounts of phase transition allow for different regions of the orthosis to be configured with different levels of rigidity (e.g., rigid, flexible, semi-rigid, etc.). In lieu of radiated heat from the interconnect, the phase transition conducted on an interwoven portion may be accomplished by applying a heated air flow or applying heated steam (i.e., combination of heat and water vapor).

For instance, where a second interwoven portion includes the same thermoplastic material as a first interwoven portion, but in lesser quantity (e.g., lesser strand numbers, thinner thermoplastic strands, lesser volume of thermoplastic strands due to interweaving/stitching pattern, etc.), after activation of the interconnect spanning the first and second interwoven portions, the second interwoven portion may remain more flexible (or at least less rigid) than the first interwoven portion. Similarly, for the situation where the second interwoven portion includes a second thermoplastic material that is different from and has a higher melting temperature than the first thermoplastic material included as part of the first interwoven portion, the second interwoven portion may remain flexible when the interconnect is activated and applies heat (below the melting temperature of the second thermoplastic material and higher than the melting temperature of the first thermoplastic material) to the second interwoven portion.

Lastly, for the situation where the second interwoven portion includes non-thermoplastic material, the second interwoven portion may retain its flexible and perhaps elastic characteristics after the heating process is conducted to convert the orthopedic precast into an orthosis to be worn by a patient. The elasticity may be due to the type of non-thermoplastic material or the interweaving techniques associated with the second interwoven portion.

A thermoplastic material used in one interwoven portion can be different from or the same as a thermoplastic material used in another interwoven (shell) portion. According to one embodiment of the disclosure, the temperature needed to activate the phase transition of the thermoplastic material within an interwoven portion may range from 50° Celsius (C) to 150° C. The difference in activation temperatures (e.g., melting temperatures of different thermoplastic material within the same or different interwoven portions may differ by 10°-20° C., 10°-30° C., 30°-50° C., or the like.

In some embodiments, the thermoplastic material composition can comprise at least 30 wt % of the orthopedic precast. For example, the thermoplastic portion can comprise between 5 wt % and 90 wt % of the precast, such as between 50 wt % and 90 wt % of the precast.

In some embodiments, the rigid, semi-rigid or flexible portions can be layered. For example, the flexible portion can be positioned adjacent to (e.g., laminated with) at least a layer of the rigid or semi-rigid portion that provides structural reinforcement for the orthosis. Alternatively, a rigid or semi-rigid portion can be positioned adjacent to (e.g., laminated with) at least one layer of a flexible portion to enhance skin comfort.

II. Terminology

As used herein, the terms "interweaved," "interweaving" and "interwoven" (or other tenses thereof) with respect to a portion of a customized wearable (e.g., orthopedic precast to be converted to an orthosis, clothing, etc.) are generally defined as any arrangement of material substantially comprising one or more strands of material (e.g., thread, yarn, etc.) to produce a portion of the wearable. The arrangement of material may include one or more types of materials attached together as a single layer of continuous material or as multiple (two or more) layers of material. This attachment may occur through an interweaving process that includes knitting, stitching (e.g., "V" shaped stiches), weaving (interlacing strands of material), crocheting (knot-like stitches), macramé (knot-like stiches in geometrical patterns), and/or even topical application such as spray-on application of thermoplastic material to alter the composition of the material such as altering a non-thermoplastic material to a thermoplastic material.

Furthermore, this interweaving of material may be performed in accordance with a two-dimensional (2D) interweaving process or a three-dimensional (3D) interweaving process. The 2D interweaving process allows for the creation of a low-profile orthoses where the shell portion and flexible portion are interwoven to form a single layer of material. The 3D interweaving process may be utilized to create a layered interwoven orthosis, such as added padding and/or additional layers of the same or different types of thermoplastic material may be added to the shell portion to increase its rigidity. Also, the increased layering provides increased density for larger-sized orthoses or in certain areas of the orthoses that need increased density (e.g., hip area, etc.).

As used herein, the terms "rigid" or "rigidity" with respect to a wearable or a portion of the wearable, such as a precast or clothing, means that the rigid object or rigid portion of the object will resist bending or deformation. According to this definition, different lengths of a given structure and composition can be rigid at a shorter length, and flexible at a longer length. As an illustrative example, in some cases, a "rigid" object or "rigid" portion(s) of the object may represent that the object or the portion of the object may be deformed, in some cases permanently (i.e., broken), if bent or twisted by a predetermined angle. For some levels of rigidity, the predetermined angle may be at least 30° end to end. For other levels of rigidity, where the object or the portion of the object may be considered to be semi-rigid, a bending or twisting over 90° (and perhaps frequent and recurrent bending or twisting) would be needed to cause deformation. As used herein, the terms "bent" or "bending" may be construed to applying an angular deformation, which may include twisting.

As used herein, the term "flexible" with respect to a wearable or a portion of the wearable may signify that the wearable or the wearable portion will not be permanently deformed by bending. For example, an interwoven portion of a precast may be flexible in nature, even after a heating and cooling process. As used herein, the term "permanently deformed" means that deformation remains unless the deformation is actively repaired. According to this definition, the wearable or a portion of the wearable could be rigid in one direction, and flexible in another direction. Unless otherwise specified in such cases, the wearable or portion of the wearable is deemed to be rigid.

As used herein, the term "elastic" with respect to a wearable or portion of the wearable means that if the elastic portion is stretched or compressed lengthwise by at least 10%, it will return to its resting length, without the need for application of an external force, and without permanent deformation.

As used herein, the term "shell" means a structure configured to impart rigidity that restrains movement of a part of a patient's body, wherein the structure is either (i) rigid after an application of a prescribed heating and cooling phase or (ii) will become rigid upon completion of that heating and cooling phase. In particular, an interwoven portion of a precast existing in a non-rigid state may constitute a shell portion by having characteristics that allow this interwoven portion to transition from its non-rigid form to a rigid form in response to an application of heat (heated air, steam, etc.) that is equal to or exceeds a prescribed melting temperature and subsequent cooling. In some embodiments, the shell may include a structure having a cavity, hollow, or lumen.

As used herein the term "patient" includes both humans and animals, independently of whether the patient is under the care of a medical or veterinary professional.

As used herein, the term "strand" is generally defined as an elongated length of one or more natural, artificial, or combined natural and artificial substances. According to one embodiment of the disclosure, each strand may be a fiber of a prescribed width (e.g., no more than 3 millimeters (mm) thick over a length of at least one centimeter (cm), although other sizing is contemplated). Examples of a "strand" may include thread, yarn, string, cord, or any flexible material that may be organized into a structure (e.g., stitched, weaved, etc.) to produce an object such as an orthopedic precast (for transformation into an orthosis) for example. Where the strand or strands denote thermoplastic material, these strands may be elongated fibers formed with thermoplastic material, or alternatively, the strand may be another substance at least partially coated with thermoplastic material or impregnated with thermoplastic material that is still subject to phase transitions (changes).

In some embodiments, the orthopedic precast may be transformed into an orthosis having a tubular construction that includes both shell and flexible portions. In some embodiments, the orthosis may be configured with a tubular construction that includes shell portions of different levels of rigidity.

In some embodiments, the shell portion orients lengthwise along the tube. For example, the shell and flexible portions of a precast could correspond to the anterior and posterior portions of a lower leg respectively, and these portions can be directly connected to each other. For such a precast, the shell portion would be considered to be oriented lengthwise along the tube. Alternatively, a shell portion can orient crosswise with respect to a tube. For example, a precast capable of accommodating a torso portion of a patient could have a shell portion that extends across the front of a patient, and flexible portions that also extend across the front of the patient, connected superiorly and inferiorly to the shell portion. For such an orthosis, the shell portion would be considered to be oriented crosswise along the tube.

As used herein, the term "crosswise" includes various degrees of diagonality.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various objects, features, aspects, and advantages of the inventive subject matter will become more apparent from the following detailed description of preferred embodiments, along with the accompanying drawing figures in which like numerals represent like components.

I. Illustrative Orthopedic Precasts

Referring to FIG. 1A, an exemplary embodiment of an orthopedic precast 100 (hereinafter, "precast") is shown, which is sized and dimensioned, after conversion into an orthosis 150 of FIG. 1B, to wrap about a torso of a patient and operate as a lumbar sacral orthosis (LSO) or part of a thoracic lumbar sacral orthosis (TLSO). The precast 100 may be configured with a first interwoven portion 110 that is formed with strands of thermoplastic material 115, which transform from a flexible to rigid (or semi-rigid) construction (referred to as a "shell portion 160") after a prescribed amount of heat is applied thereto and subsequently cooled. This rigidity may be associated with movement in a first direction (e.g., vertically) while lateral flexibility is retained so that the resultant orthosis 150 can be laterally adjusted to surround hip areas of the patient.

Positioned along an upper and lower edges of the first interwoven portion 110, upper and lower interwoven portions 120 and 122 may feature one or more strands comprising non-thermoplastic material that retain their flexible construction even after heating (each referred to as a "flexible portion"). Collectively, as shown, the interwoven portions 110, 120 and 122 generally compose a tube (e.g., belt) 130, with two open ends. In this particular example, both flexible portions 120, 122 are oriented on opposite outer edges of the first interwoven portion 110 to create a transitional area therefrom. This transitional area is intended, when the precast 100 is formed into the orthosis 150 of FIG. 1B, to provide a more comfortable fit of the orthosis 150.

According to one embodiment of the disclosure, referring back to FIG. 1A, the strands of the thermoplastic material 115 forming the first interwoven portion 110 may include a single type of thermoplastic material. Alternatively, the strands 115 forming the first interwoven portion 110 may constitute a composite of materials, which may include at least two different thermoplastic materials, where the thermoplastic materials may have the same or different melting temperatures. As yet another alternative embodiment of the disclosure, the strands 115 forming the first interwoven portion 110 can also be an interwoven composite of one or more thermoplastic strands and one or more non-thermoplastic materials, provided the rigidity of the resultant shell portion 160 of FIGS. 1B-1C is altered after a selected temperature and duration of heat is applied and the first interwoven portion 110 is cooled.

More specifically, according to one embodiment of the disclosure, the strands of the thermoplastic material 115 may be interwoven within the first interwoven portion 110 to form one or more pathways 135 (hereinafter, "pathways"). The pathways 135 may be constructed as continuous pathway or may be constructed as multiple, disconnected pathways positioned throughout the first interwoven portion 110. The strands of material forming the pathway 135 may include, but is not limited or restricted to (i) strands of a single type of thermoplastic material with a prescribed melting temperature configured as the pathway 135, (ii) strands of thermoplastic material interwoven with strands of one of more different types of thermoplastic material (with different melting temperatures) configured as a pathway, (iii) strands of thermoplastic material interwoven with strands of non-thermoplastic material (or any combination thereof) to create the pathway 135.

Herein, interconnects 140 may be arranged to reside within the pathways 135 for use as heating elements. As shown in FIGS. 1A-1B, thermoplastic material within the first interwoven portion 110 may be arranged in proximity to the pathways 135. As a result, the strands of thermoplastic material 115 undergo a phase change (e.g., melt and flow to at least partially collapse the pathways 135 for creation of the shell portion 160 after cooling) in response to heat radiated by the interconnects 140 situated within the pathways 135 when the interconnects 140 are activated (e.g., receive power). Herein, the interconnects 140 may be interwoven as part of the first interwoven portion 110 or may be inserted (e.g., threaded through the pathways 135) after the first interwoven portion 110 has been created. For example, one or more strands of conductive material (e.g., wire(s)) may be interwoven so as to reside in the pathways 135 or one or more strands of conductive material may be fished through the pathways 135 (e.g., interweave a lead line having a looped end to which strand(s) of conductive material may be attached and pulled through the pathways 135 by pulling of the lead line out of the pathways 135).

Referring still to FIG. 1A, the strands of thermoplastic material 115 may be formed of thermoplastic material in their entirety or the strands of a different material coated and/or impregnated (through an application process) with one or more thermoplastic materials. Herein, a "strand of thermoplastic material" may reference a strand formed of material inclusive of thermoplastic material that, when heated and cooled, alter the overall rigidity of the material while a "strand of non-thermoplastic material" may reference a strand of material devoid of thermoplastic material that affects its rigidity.

According to one embodiment of the disclosure, the thermoplastic materials may be configured to form flexible strands at room temperature, are non-toxic, melt between 140° C. and 350° C., and become rigid or semi-rigid when strands are partially melted together into a sheet or mat having a thickness of 0.5 mm to 6 mm. Contemplated examples of thermoplastic materials may include, but are not limited or restricted to the following: Polyethylene Terephthalate (PET), Polyether ether ketone (PEEK), Polyphenylene oxide (PPO), Polypropylene (PP), polyethylene (PE), polyvinyl chloride (PVC) and polystyrene (PS), poly (methyl methacrylate) (PMMA), Acrylonitrile butadiene styrene (ABS), Polylactic acid (PLA), Polybenzimidazole (PBI), Polycarbonate (PC), Polyether sulfone (PES), Polyoxymethylene (POM), Polyphenylene sulfide (PPS), Polystyrene, Polyvinyl chloride (PVC), Polyvinylidene fluoride (PVDF), Polytetrafluoroethylene (PTFE), Polyamide 6 (PA6), Polybutylene terephthalate (PBT), Polyetherimide (PEI), or the like.

The thermoplastic and non-thermoplastic materials can be selected using any combination of natural and synthetic materials to accomplish a desired characteristic, as for example, a desired degree of stiffness, compressibility, flexibility, bending, stretch, and resilience. As described above, one or more strands associated with the first interwoven portion 110 may include both thermoplastic and non-thermoplastic materials. For example, as an illustrative embodiment, the non-thermoplastic material may include Kevlar™ to increase the durability/toughness of the shell portion 160 of the resulting orthosis 150, as one or more other non-thermoplastic materials (e.g., cotton fibers, non-carbon fibers, nanotubes, glass fibers, ceramic, and/or metal fibers) may be used.

Similarly, as another illustrative embodiment, one or more strands of material forming the upper/lower interwoven portion(s) 120 and/or 122 can also comprise thermoplastic and/or non-thermoplastic materials to retain elasticity. However, according to this embodiment of the disclosure, in lieu of or in addition to the non-thermoplastic material, the upper/lower interwoven portion(s) 120 and/or 122 may include thermoplastic material having a higher melting point that is substantially above the melting point of the thermoplastic material interwoven in the first interwoven portion 110.

As a result, one of the inventive concepts is that a precast 100 forming the orthosis 150 will have (1) one or more interwoven strands of a first (thermoplastic) material, which upon heating, partially melt and therefore fuse together with other material within the first interwoven portion 110 to form the rigid (or semi-rigid) shell portion 160 of the orthosis 150, and (2) one or more interwoven strands of a second (non-thermoplastic) material remain flexible upon cooling, either because they do not melt, or they melt an insubstantial amount at the temperature used to melt the thermoplastic materials interwoven into the first interwoven portion 110. Accordingly, the terms "insubstantial" and "substantial" are used herein in that context as to the amount of thermoplastic material melting to change a portion of the precast of the orthosis into a rigid or semi-rigid state.

It should be appreciated then, that the one or more interwoven strands of a different material or materials that remain flexible upon cooling might or might not include a thermoplastic material. For instance, one or more interwoven strands of a different material or materials remaining flexible upon cooling may comprise a natural fiber such as cotton or wool. To avoid oxidation of such non-thermoplastic materials, heating can take place in an anoxic or low oxygen environment.

In production, the orthopedic precast 100 may be placed over a positive mold and heated, such that at least some of the thermoplastic material(s) fuse, in what will become a rigid or semi-rigid shell portion 160 for the orthosis 150. This allows the shell portion 160 to closely conform to whatever part(s) of the patient are to be motion-restrained. Alternatively, the precast 100 may be placed over a first positive mold, removed inside-out to provide a different (opposite) layering scheme for this flipped precast, which is placed over a second positive mold, heated, and subsequently cooled to form the orthosis 150 with the rigid or semi-rigid shell portion 160 having multiple layers.

The precast 100 has a tubular configuration, with superior and inferior open ends. However, as depicted in FIGS. 1B-1C, the orthosis 150 can also open and close laterally, using a fastener such as a Velcro™ or similar hook and loop fastener 165, which can be installed at the precast stage. Any suitable fasteners are contemplated, including buttons, toggles, studs, snap fastener, poppers, buckles, zippers, frogging, hooks and eyes, magnets, grommets, brooches, safety pins, fabric ties, and laces.

Figure 1B:
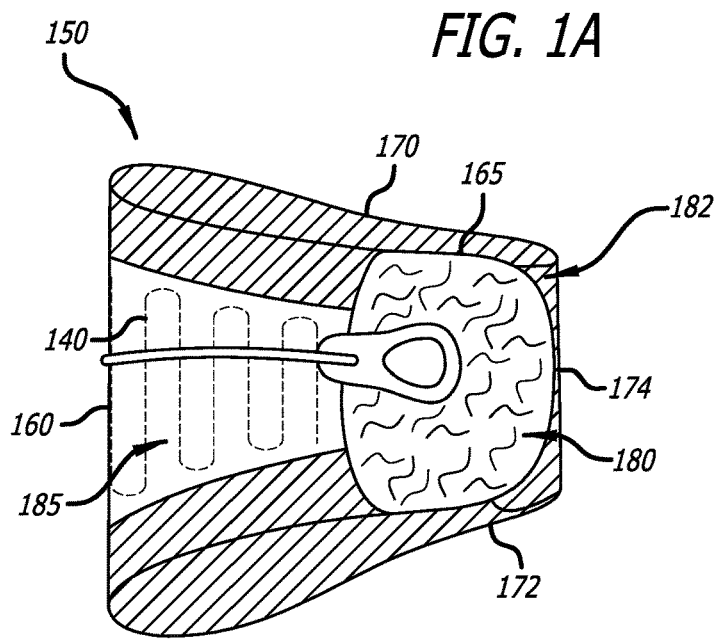
FIG. 1B is a perspective view of an exemplary embodiment of interconnects positioned within an orthosis generated from the orthopedic precast of FIG. 1A.
Figure 1C:
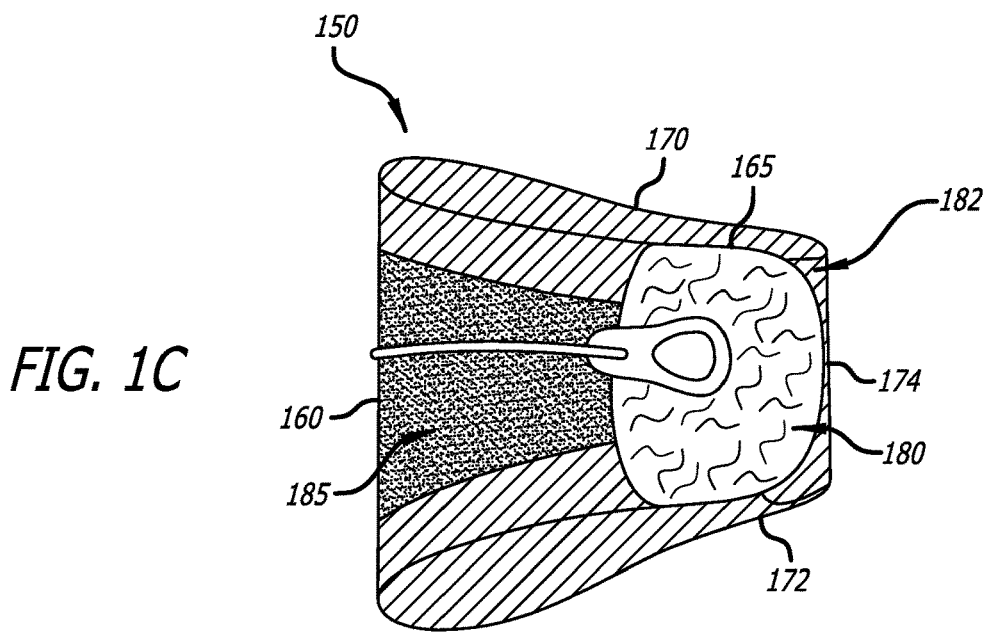
FIG. 1C is a perspective view of an exemplary embodiment of the orthosis generated from the orthopedic precast of FIG. 1A as a torso orthosis.

As shown in FIGS. 1A-1C, the interwoven portions 120, 122 can advantageously be elastic, and in especially preferred embodiments, portions 120, 122 can be constructed with a lesser amount of thermoplastic material, thermoplastic material with higher melting threshold or no thermoplastic material to be increasingly flexible and/or elastic towards the outer edges. Such variance in flexibility and elasticity can promote the patient's comfort by transitioning pressure against the body. Thereafter, the flexible portions 170 and 172 of the orthosis 150 may remain elastic even after the heating and cooling processes. Elasticity is advantageous because it causes the orthosis 150 to conform to different body shapes. Moreover, since the shell portion 160 of the orthosis 150 has limited extendibility, the flexibility of portion 174 could be sufficient to allow a user to pull the orthosis 150 around the waist, as an alternative means of placement.

As shown, the orthosis 150 includes a strap or cord to further secure the orthosis 150 on a patient's body, such as by cinching mechanism (not shown) originally positioned along a backside of the precast 100. Also, as shown in FIG. 1C, the first interwoven portion 110 of the precast 100 may feature arm areas 180 and 182 and a central area 185 from which the arm areas 180 and 182 extend. The central area 185 may include strands of a first thermoplastic material while the arm areas 180 and 182 may feature strands of a second thermoplastic material having a higher melting temperature (T2) than a melting temperature (T1) of the first thermoplastic material and/or non-thermoplastic material. Upon activating the interconnects 140 to convert the precast 100 to the orthosis 150 (e.g., applying heat to the first interwoven portion 110 at a temperature t (T2>t≥T1), the central area 185 of the first interwoven portion 110 remains elastic while the arm areas 180 and 182 undergo a phase transition from a flexible construction to a rigid or semi-rigid construction.

Figure 2A:
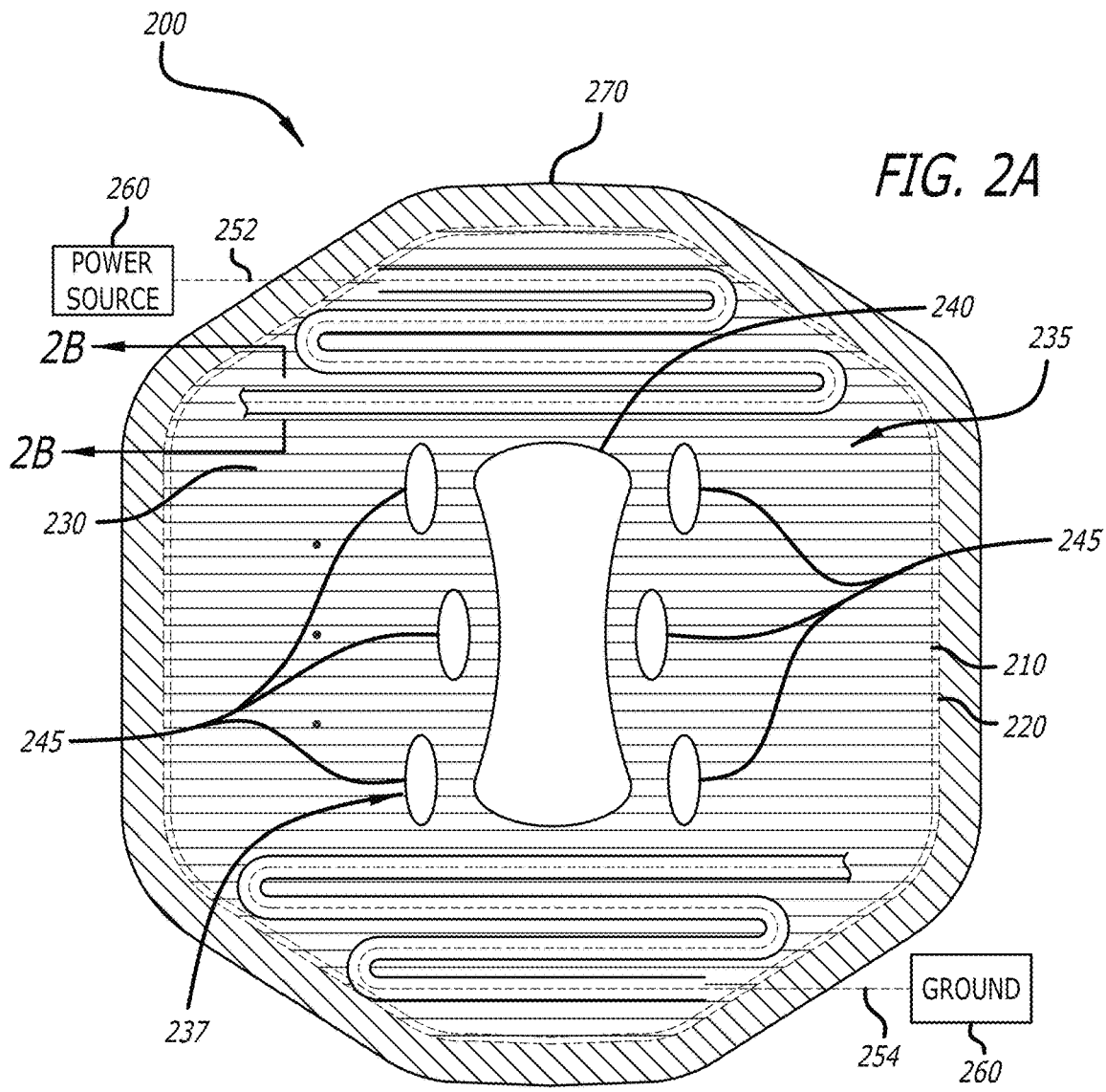
FIG. 2A is a perspective view of a first exemplary embodiment of a precast configured for conversion into a back orthosis.
Figure 2B:
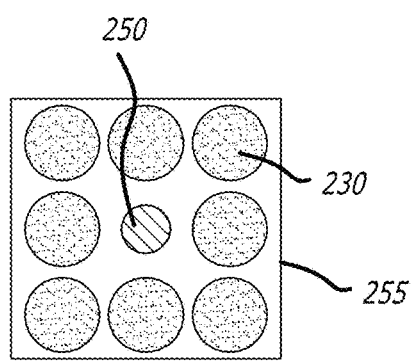
FIG. 2B is a perspective view of layering of strands of thermoplastic material in forming the pathway within the back orthosis of FIG. 2E.
Figure 2D:
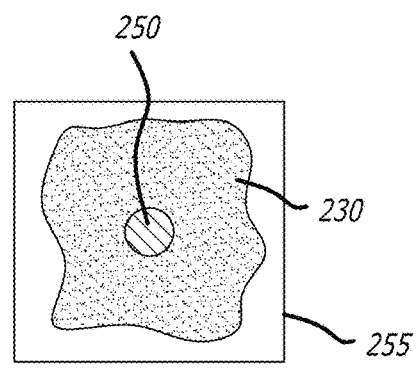
FIG. 2D is a perspective view of the phase transition conducted by the thermoplastic material in forming the pathway to surround the interconnect propagating through the back orthosis of FIG. 2E.
Figure 2C:
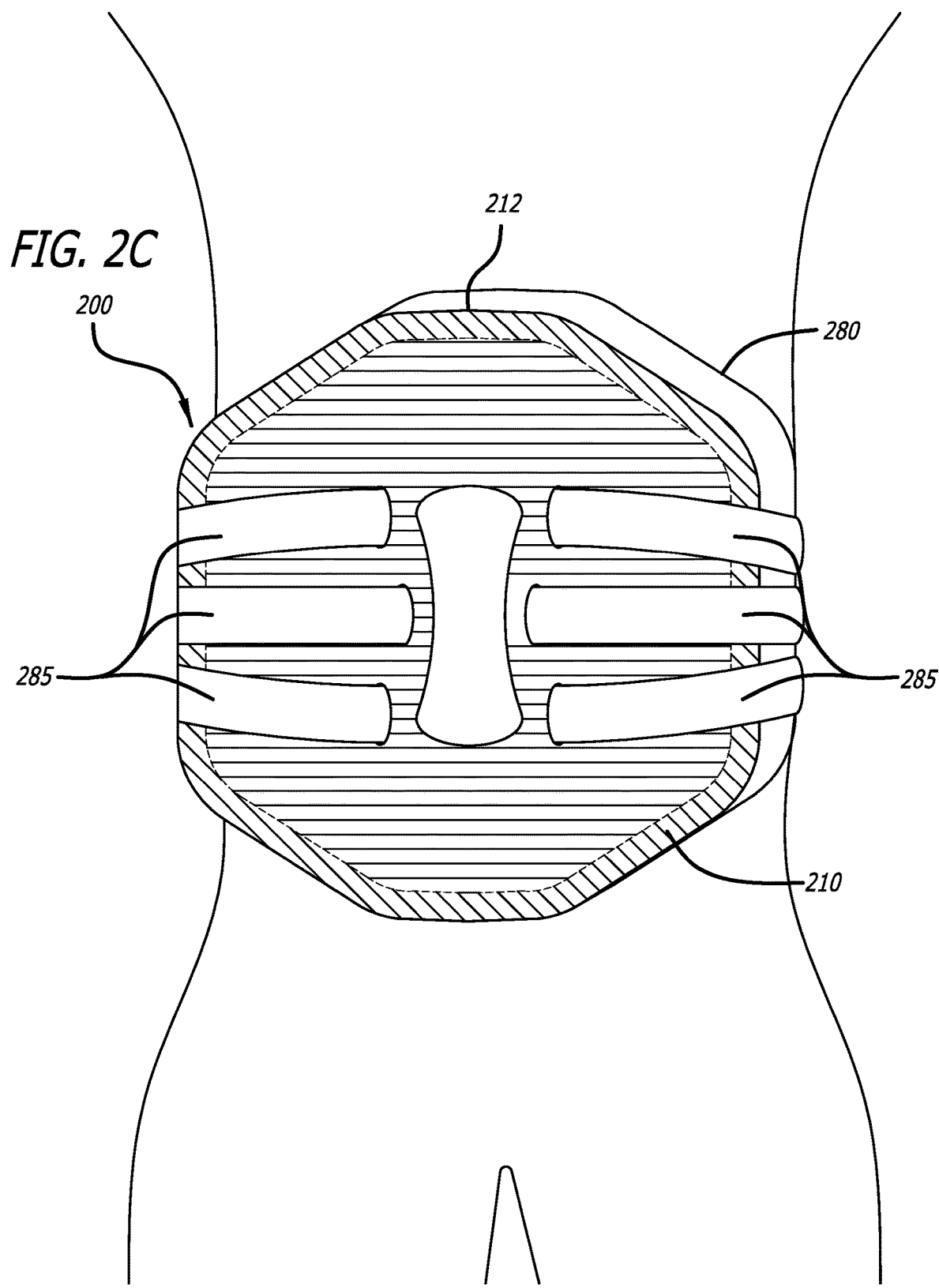
FIG. 2C is a perspective view of the precast of FIG. 2A being worn by the patient and concurrently heated to form a back orthosis.
Figure 2E:
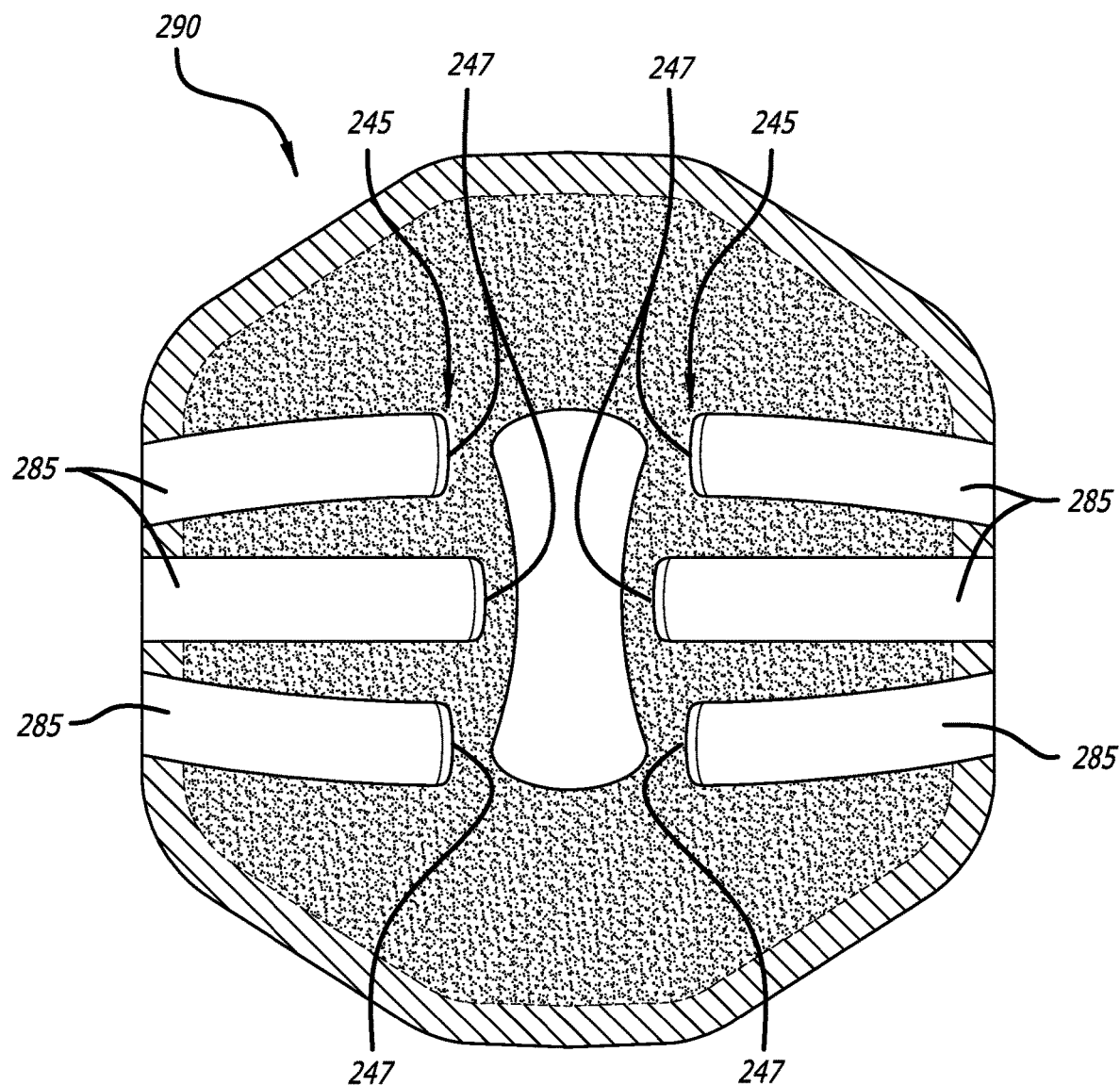
FIG. 2E is a perspective view of the back orthosis upon transitioning from the orthopedic precast of FIG. 2A.

Referring now to FIGS. 2A-2B, an exemplary embodiment of an orthopedic precast 200 is shown, which is sized and dimensioned after phase transition from the precast 200 into a back orthosis 290 (see FIG. 2E). Herein, the precast 200 includes a first orthosis layer 210 of material and one or more additional orthosis layers 220 of material that overlay the first orthosis layer 210 (collectively, "orthosis material layers 210/220"). For this embodiment of the disclosure, the first orthosis layer 210 includes strands of thermoplastic material 230 attached together in accordance with a prescribed interweaved pattern 235. For example, the pattern 235 may feature strands of thermoplastic material 230 interwoven laterally across the first orthosis layer 210 with stoppages to form apertures 237 within the precast 200. As shown, the apertures 237 formed within orthosis material layers 210/220 may include a midline aperture 240 along with a plurality of strap guide slots 245.

According to this embodiment of the disclosure, an interconnect 250 may be positioned within one or more pathways 255 formed within regions of the orthosis material layers 210/220 that are targeted to undergo phase transitioning (e.g., flexible to semi-rigid or rigid). More specifically, the pathway(s) 255 may be a single continuous pathway formed throughout the targeted regions of the orthosis material layers 210/220 that are intended to partially house the interconnect 250 as shown in the cross-sectional view of the pathway 255 in FIG. 2B. The interconnect 250 may be interwoven concurrently with the interweaving of the strands of thermoplastic material 230 or another strand (i.e., threading strand) may be positioned within the pathway(s) 255 to which the interconnect 250 may be attached and pulled through the pathway(s) 255 as the threading strand is pulled and removed from the pathway(s) 255.

For one embodiment of the disclosure, the interconnect 250 features a first end 252 and a second end 254. When a power/ground source 260 is coupled to the first end 252 and the second end 254 of the interconnect 250 to establish a current therethrough, the interconnect 250 operates as a heating element. As a temperature of the interconnect 250 rises to a prescribed temperature, such as the melting temperature for the strands of thermoplastic material for example, the strands of the thermoplastic material begin to undergo phase transitions by melting and diffusing towards targeted regions of the orthosis that are intended to be semi-rigid or rigid in construction, whereby the pathway 255 tends to collapse as shown in the cross-sectional view of the pathway 255 in FIG. 2D.

For the orthopedic precast 200 to be transformed into the back orthosis 290 of FIG. 2E, all of the regions are intended to be semi-rigid or rigid regions for the orthosis 290, except at its periphery 270 and at the apertures 237. The diffusion of the thermoplastic material allows for the creation of rigid or semi-rigid region of the orthosis 290 after cooling and enables customization of the orthosis 290 to account for relief areas needed for the patient based on the patient's anatomy.

Alternatively, the pathway(s) 255 may correspond to a series of discrete pathways formed within the targeted regions of the orthosis material layers 210/220, where each of the discrete pathways 255 may include a segment of the interconnect 250. Although not shown, for this embodiment, each segment of the interconnect 250 would need to be coupled to the power/ground source 260. Therefore, the ends for each of these segments would need to be accessible for coupling to the power/ground source 260.

As shown in FIG. 2C, the precast 200 may be placed on and affixed to a back of the patient by fastening straps 285, where the first orthosis layer 210 may be positioned to be more physically proximate to a back of a patient than the other orthosis layers 220. An insulating panel 280 may be positioned between an anterior surface 212 of the first orthosis layer 210 and a back of the patient to protect the patient while allowing the back orthosis 290 to be conformed consistent with a shape of the patient's back and heat is applied at a first temperature to the posterior surface of the first orthosis layer 210. The insulating panel 280 may be removably coupled to the anterior surface 212 of the first orthosis 210 (e.g., tear-away deployment, layered to the precast 200 and decoupled (e.g., cut connected strands, etc.) therefrom.

Herein, the heat causes the posterior surface of the first orthosis layer 210 to solidify the back orthosis 290 after cooling. An insulating panel 280 may be positioned between an anterior surface 212 of the first orthosis layer 210 and a back of the patient to protect the patient while allowing the orthopedic precast 200 to undergo a customized phase transition to generally conform to a shape of the patient's back and harden after cooling. Of course, in lieu of heating the orthopedic precast 200 affixed to a back of the patient, it is contemplated that the orthopedic precast 200 may be affixed to a casting (e.g., mold) of the patient's torso and/or back area.

The additional orthosis layers 220 may overlay and may be interweaved with the first orthosis layer 210 to provide components 247 integrated as part of a posterior surface of the first orthosis layer 210. For example, these components 247 may be configured as extended elements of the strap guide slots 245 as shown in FIG. 2E. The strap guide slots 245 may be used to direct the fastening straps 285 to the back orthosis 290 for use in tightening the orthosis 290 to the patient.

Referring to FIG. 3A, an exemplary embodiment of an orthopedic precast 300 is shown, which can be heated and cooled to produce a first type of ankle-foot-orthosis (AFO) configured to restrict movement of lower leg of a patient relative to the foot. The precast 300 generally includes a first interwoven portion 310 and a second interwoven portion 340. Herein, the first interwoven portion 310 and the second interwoven portion 340 cooperate to support posterior and anterior parts of the lower leg, respectively. The first interwoven portion 310 and the second interwoven portion 340 are oriented lengthwise as a long sock featuring a tube 305 having an open upper calf end and a closed toe end.

Figure 3D:
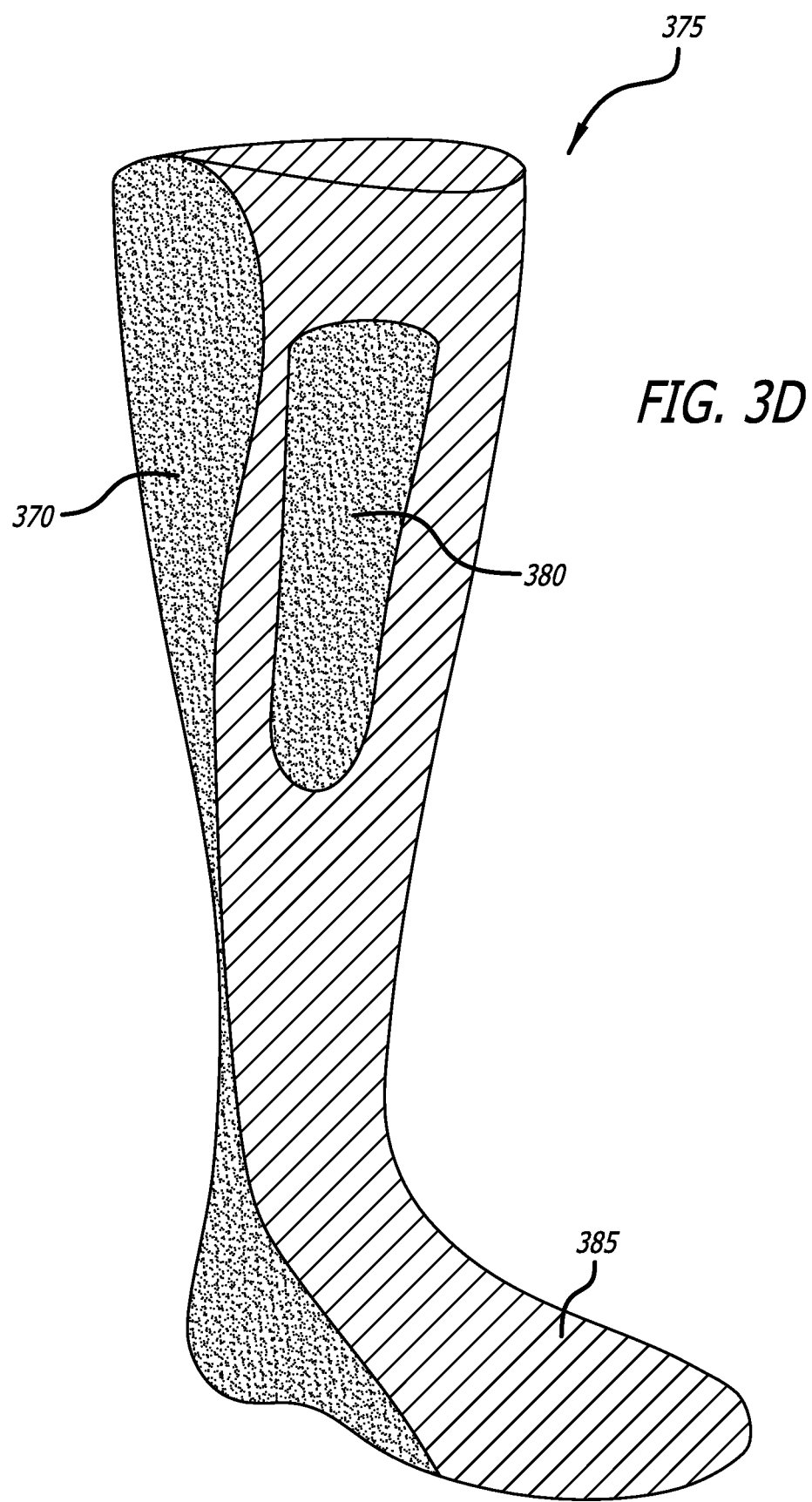
FIG. 3D is a perspective view of the leg-ankle-foot orthosis upon transitioning from the orthopedic precast of FIG. 3A.

The first interwoven portion 310 may be formed with strands of a first thermoplastic material 315, which includes one or more pathways 320 formed therein, where a section of this pathway/interconnect configuration is shown in FIG. 3B. The pathways 320 may be configured with interconnects 325 that, when powered by a power/ground source 260, generate and radiate heat at a temperature to melt the first thermoplastic material 315 at least partially. As a result, the first thermoplastic material 315 undergoes a phase transition that, after cooling, causes the first interwoven portion 310 to become hardened and operate as a shell portion 370 within a resultant orthosis (AFO) 375 as shown in FIG. 3D. The shell portion 370 is a hardened component for the AFO 375 formed from the first interwoven portion 310 of the precast 300. A remaining elastic portion 385, which did not undergo a significant phase transition, allows for easy removal of AFO 375, while the shell portion 370 provides dorsiflexion, plantarflexion, inversion, and eversion stability at the ankle. It is contemplated that other portions of the precast 300 may deploy thermoplastic material for hardening such as the sole of the foot or perimeter of the foot area to operate as a cast-like orthosis.

As further shown in FIG. 3A, the second interwoven portion 340 may be formed to include a first area with elastic, non-thermoplastic material 345 operating as a flexible portion for the precast 300 (as well as the resultant orthosis) and a second area with a second thermoplastic material 350 arranged to operate as a pocket 380 (e.g., spacing between layers of the second thermoplastic material 350). The second thermoplastic material 350 may be identical to the first thermoplastic material 315 or may be another type of thermoplastic material with a melting temperature greater or lesser than the melting temperature of the first thermoplastic material 315. According to one embodiment of the disclosure, the second thermoplastic material 350 constitutes a thermoplastic material different than the first thermoplastic material 315 and having a higher melting temperature so that, upon heating the orthopedic precast 300 at the same temperature, the pocket will be semi-rigid in design to allow some flexibility in movement for the placement of protective panels (e.g., shin guards, cooling packs, heat packs, etc.) into the pocket 380.

As shown in FIGS. 3A & 3C, within the pocket 380, the pathways 355 may be configured with an interconnect 360 that, when powered by the power/ground source 260 (or another power supply), the interconnect 360 heats up and radiates heat at a temperature to melt the thermoplastic material 350 at least partially. As a result, the thermoplastic material 350 also undergoes a phase transition so that, after cooling, hardens to form the pocket 380 for the AFO 375 while the remaining elastic portion 385 associated with the second interwoven portion 340 retains its elasticity.

The precast 300 could also be provided in a preformed condition, in an average shape of a given anatomical size. Various sizes could be offered accordingly. This pre-shaped item could be commercially offered as an "off-the-shelf" product that could be provisioned to a patient of average contours given their dimensions without modification. It could also provide the opportunity for optimization of the contours through heating and reforming the shell material(s) in strategic locations while worn to create a customized orthosis for the patient.

Strategic use of elastic regions can enhance functionality. For example, in FIG. 3D, the elastic portion 385 can function to press the shell portion 370 against the back of the leg, and that can assist in lifting the foot during swing phase of ambulation. In some embodiments, the orthosis 375 derived from the precast 300 can have a slightly dorsiflexed configuration such that when worn, the weight of the foot pulls the foot into a neutral (neither dorsiflexed nor plantarflexed) or other desired configuration.

As shown in FIGS. 3A-3D, the relative dimensions of the first interwoven portion 310 (and corresponding resultant shell portion 370) and portions of the second interwoven portion 340 (and corresponding resultant pocket 380 and the elastic portion 385) may be customized with different thicknesses to provide additional reinforcement for the patient when worn. For example, the first interwoven portion 310 of the precast 300 may be configured with areas having a different interweaved pattern and/or different thermoplastic strand thickness (or volume) than the second interwoven portion 340. Additionally, or in the alternative, the resultant shell portion 370 may feature different regions having different levels of rigidity caused by different interweaving patterns and/or different thermoplastic strand thickness (or volume). Stated differently, the precast 300 may feature the first interwoven portion 310 that produces a first region of the shell portion 370 having a first rigidity level and another region of the shell portion 370 having a second rigidity level that is more or less rigid than the first region.

Referring now to FIGS. 4A-4D, embodiments of precasts with multiple layers of interwoven material are described. According to these embodiments, each precast may include multiple interwoven layers of materials. Precasts with multiple material layers May be accomplished through a number of techniques, including complex multi-layering interweaving processes, separate interwoven portions positioned on each other and attached together, or a precast with a single layer of interwoven materials that is folded over itself or another precast to form multiple layered interwoven portions. Pathways may be formed between these layers of interwoven material as shown.

Figure 4A:
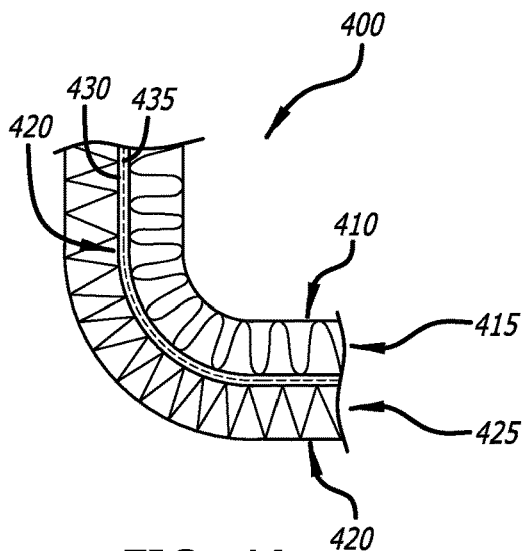
FIG. 4A is a cross-sectional view of an exemplary embodiment of an orthopedic precast illustrating one or more strands of thermoplastic material.

Referring to FIG. 4A, an exemplary embodiment of an orthopedic precast 400 is shown, which includes a first interwoven portion 410 and a second interwoven portion 420. Herein, the second interwoven portion 420 features one or more strands of a second material 425 with a lower melting point than one or more strands of a first material 415 associated with the first interwoven portion 410. For this illustrative embodiment, different materials 415 and 425 may be layered when forming the precast 400 and a pathway 430 is created between the first interwoven portion 410 and the second interwoven portion 420. For example, the second material 425 may be partially melted when a prescribed temperature is applied to provide rigidity after cooling while the first material 415 may experience no phase change (e.g., no change from solid to partial liquid phase that is cooled to re-solidify), but instead, operates as an inner spacer to provide padding and airflow.

As with all examples herein, where the second material 425 associated with the second interwoven portion 420 constitutes a thermoplastic material with a lower melting point than the first material 415 associated with the first interwoven portion 410, it is contemplated that the difference in melting points can arise because the first material 415 has no melting point or a melting point considerably greater than the melting point of the second material 425. For example, the first material 415 may be a nylon or Kevlar™ for example.

The pathway 430 may include an interconnect 435, such as a strand of conductive material that may be used as a heat element or may be used to transfer electrical signals between components positioned on or proximate to the orthosis. The interconnect 435 may be interweaved during creation of the orthopedic precast 400 including the first interwoven portion 410 and the second interwoven portion 420 (see FIG. 4E). Additionally, or in the alternative, the interconnect 435 may be added after the precast 400 has been created by attaching the interconnect 435 to a lead line 440 installed within the pathway 430 (interwoven to be loose or detached by cutting a visible connection point) and pulling the interconnect 435 through the pathway 430 as the lead line 440 is pulled out of the pathway 430 as shown in FIG. 4F.

Figure 4B:
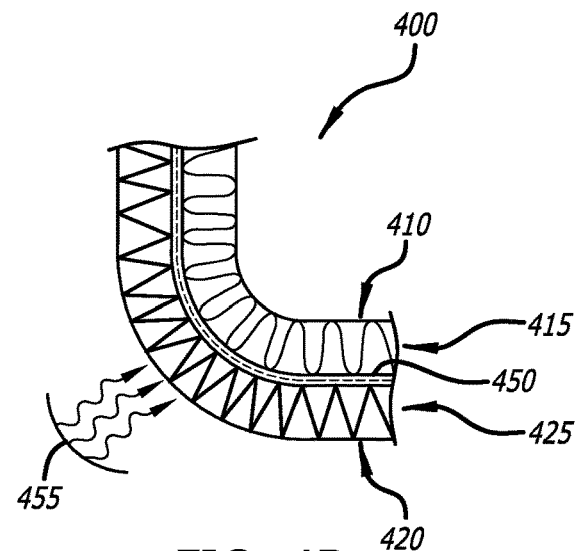
FIG. 4B is a cross-sectional view of an exemplary embodiment of the orthopedic precast of FIG. 4A, in which a strand of thermoplastic material is heated.

Referring now to FIG. 4B, an exemplary embodiment of the portion of an orthopedic precast 400 shown in FIG. 4A is shown, following heating at or above the lower range of the melting point of the thermoplastic material 425 of the second interwoven portion 420. Upon the application of heat at or above the lower range of the melting point of the thermoplastic material 425, one or more portions 450 of the thermoplastic material 425 partially melts and diffuses towards the pathway 430 and in contact with the first material 415. As shown, the heat may be provided by the interconnect 435 within the pathway 430 operating as a heating element. Additionally, or in the alternative, the heat may be provided by a remote heat source 455 that produces a heated ambient environment, produces heated air flow, or produces heated steam. After cooling, the thermoplastic material 425 solidifies and the second interwoven portion 420 becomes rigid or semi-rigid while the first material 415 retains the same phase and operates as a soft interface between the second interwoven portion 420 and the skin of the patient.

Figure 4C:
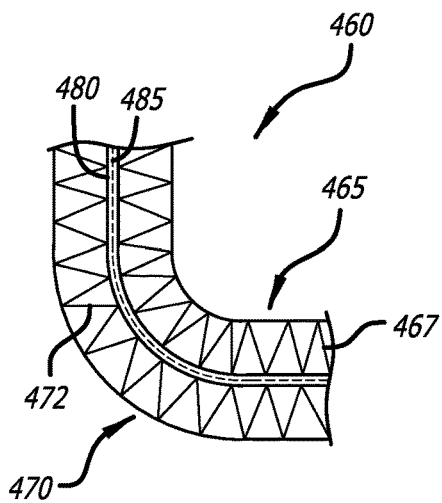
FIG. 4C is a cross-sectional view of an exemplary embodiment of the orthopedic precast undergoing a conversion into an orthosis with the interconnect interwoven with multiple layers of thermoplastic material.
Figure 4D:
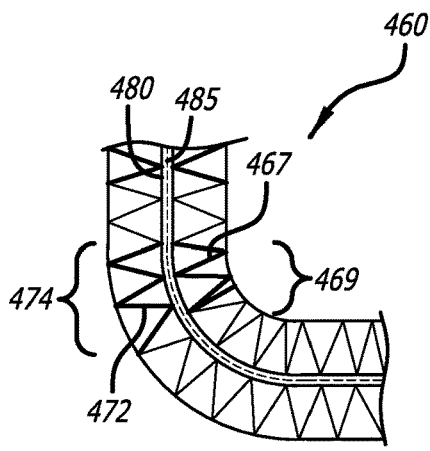
FIG. 4D is a cross-sectional view of an exemplary embodiment of an orthosis generated based on the orthopedic precast of FIG. 4A with portions of the multiple layers of thermoplastic material forming shell portions of the orthosis.
Figure 4E:
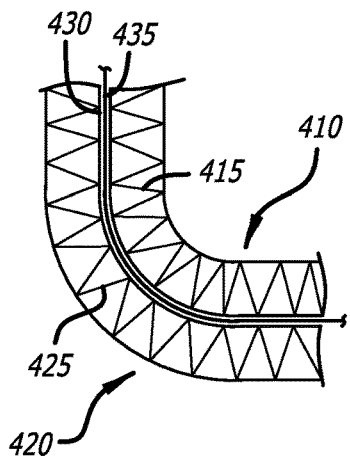
FIG. 4E is a cross-sectional view of an exemplary embodiment of a section of the orthopedic precast interwoven with an interconnect.
Figure 4F:
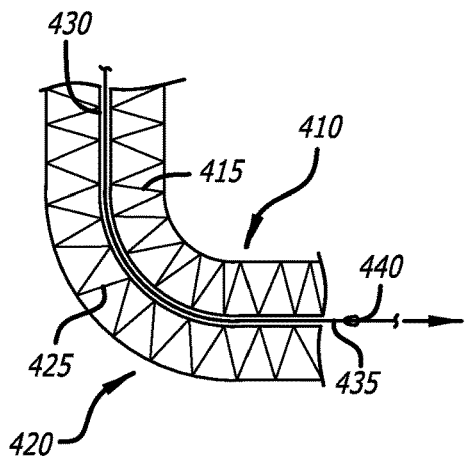
FIG. 4F is a cross-sectional view of an exemplary embodiment of a section of the orthopedic precast interwoven with a feed line to which the interconnect is attached and threaded through pathways formed within the orthopedic precast.

Referring now to FIGS. 4C-4D, exemplary embodiments of an orthopedic precast 460 undergoing a conversion into an orthosis is shown. The orthopedic precast 460 features a first interwoven portion 465, a second interwoven portion 470, and a pathway 480 formed between the strands of material forming the first interwoven portion 465 and the second interwoven portion 470. Herein, the first interwoven portion 465 includes one or more strands of a thermoplastic material 467 having a prescribed melting temperature and the second interwoven portion 470 includes one or more strands of the thermoplastic material 472 having the prescribed melting temperature.

The pathway 480 may include an interconnect 485, such as a strand of conductive material that may be used as a heat element or may be used to transfer electrical signals between components positioned on or proximate to the orthosis after being formed. The interconnect 485 may be interweaved with the strands 467/472 of the thermoplastic material during creation of the orthopedic precast 400. Additionally, or in the alternative, as described above, the interconnect 485 may be added after the precast 460 has been created by insertion into the pathway 480.

For this illustrative embodiment, as shown in FIG. 4D, the strands 467/472 may be layers of the precast 460 with the pathway 480 arranged therebetween. When heat is applied by the interconnect 485 powered and operating as an integrated heating element, one or more portions 469 of the strands of thermoplastic material 467 associated with the first interwoven portion 465 and one or more portions 474 of the strands of thermoplastic material 472 associated with the second interwoven portion 470 may partially melted when the prescribed melting temperature is applied. Moreover, portions of the thermoplastic materials 469/474 may diffuse towards the pathway 480 and intermingle to create collective rigid or semi-rigid area covering portions of both the first interwoven portion 465 and the second interwoven portion 470 after cooling.

Figure 5A:
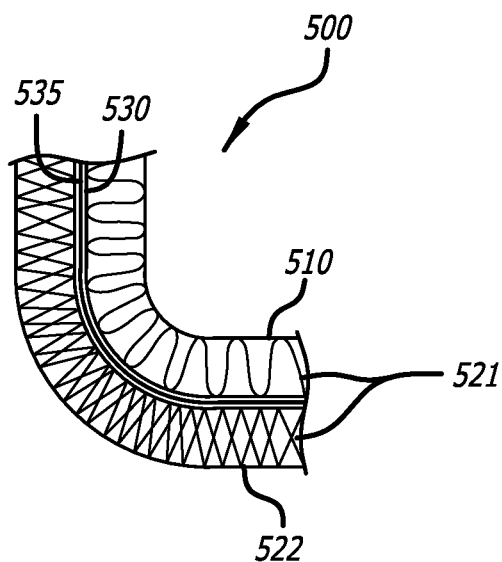
FIG. 5A is a cross-section view of an exemplary embodiment of a portion of an orthopedic precast having a first interwoven portion configured with a higher concentration of a thermoplastic material than in a second interwoven portion.

Referring to FIG. 5A, an exemplary embodiment of a portion of an orthopedic precast 500 having a second interwoven portion 522 configured with a higher concentration of a thermoplastic material 521 than a first interwoven portion 510 is shown. A pathway 530 is interwoven between the first interwoven portion 510 and the second interwoven portion 520. The pathway 530 may include an interconnect 535 that, when connected to a power source and ground, may operate as a heating element for the orthopedic precast 500 as being worn by the patient. Although not shown, additional padding and/or insulation may be positioned on an interior surface 512 of the first interwoven portion 510 to prevent the patient from being exposed to high thermal temperatures that may exceed temperatures of 50° C., 75° C., or higher.

According to this embodiment of the disclosure, upon applying heat at or above the lower range of the melting temperature of the thermoplastic material 521, both the first interwoven portion 510 and the second interwoven portion 522 may experience a partial phase transition caused by partially melting of the thermoplastic material 521. The partial phase transition (change) may cause diffusion of the thermoplastic material 521 from both the first interwoven portion 510 and the second interwoven portion 520 towards the pathway 530.

As shown, the second interwoven portion 522 may experience a greater volume of melted thermoplastic material 521 due to its higher concentration level. Therefore, after cooling, both the first interwoven portion 510 and the second interwoven portion 522 may solidify, with the second interwoven portion 522 becoming more rigid than the first interwoven portion 510 due to the higher concentration of thermoplastic material. As a result, the orthosis produced by the precast 500 may feature different layers with an outer layer associated with the second interwoven portion 522 having a higher level of rigidity than an inner layer associated with the first interwoven portion 510.

Figure 5B:
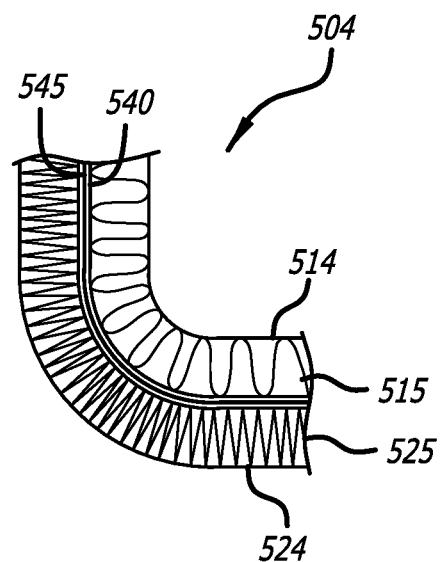
FIG. 5B is a cross-section view of an exemplary embodiment of a portion of an orthopedic precast having a first interwoven portion configured with a tighter knit than in a second interwoven portion.

Referring now to FIG. 5B, an exemplary embodiment of a portion of an orthopedic precast 504, which features a first portion 514 of the precast 504 configured with thermoplastic material interwoven in accordance with a first interweaving pattern 515 and a second portion 524 of the precast 504 interwoven in accordance with a second interweaving pattern 525. The second interweaving pattern 525 is different from the first interweaving pattern 515. Additionally, a pathway 540 may be formed between the first interwoven portion 514 and the second interwoven portion 524, where an interconnect 545 may be included within the pathway 540. When connected to the power source and ground, the interconnect 545 may operate as a heating element for the orthopedic precast 504 during a fitting and donning process of the orthosis by a clinician.

Herein, for this illustrative example, the second interweaving pattern 525 of a thermoplastic material is tighter than the first interweaving pattern 515 of the thermoplastic material. According to this precast architecture, upon applying heat at or above the lower range of the melting point of the thermoplastic material by the interconnect 545 operating as a heating element, both the first interwoven portion 514 and the second interwoven portion 524 may experience a partial phase transition caused by partially melting of the thermoplastic material. As in FIG. 5A, the partial phase transition may cause diffusion of the thermoplastic material 521 from both the first interwoven portion 510 and the second interwoven portion 520 towards the pathway 540.

Given this second interweaving pattern 525 features a greater amount of thermoplastic material over a prescribed distance or area than the first interweaving pattern 515, the second interwoven portion 524 may experience a greater volume of melted thermoplastic material. As a result, after cooling, the second interwoven portion 524 may be formed as a shell portion with greater rigidity and the first interwoven portion 514 may also be formed as a shell portion. Hence, different types of interweaving patterns may be used to influence the rigidity of a resultant shell portion(s) of an orthosis.

Figure 5C:
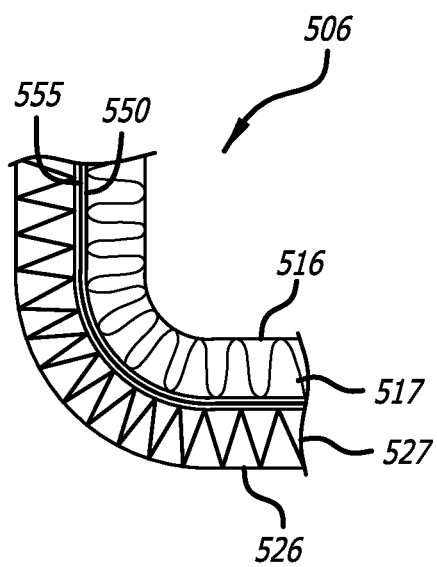
FIG. 5C is cross-section view of an exemplary embodiment of a portion of an orthopedic precast having a first interwoven portion configured with thicker strands of a thermoplastic material than in a second interwoven portion.

Referring to FIG. 5C, an exemplary embodiment of an orthopedic precast 506 having a first interwoven portion 516 configured with thinner strand(s) 517 of a thermoplastic material than the second interwoven portion 526 is shown. Stated differently, the second interwoven portion 526 is configured with thicker strand(s) 527 of the thermoplastic material than the strand(s) 517 of the thermoplastic material in the first interwoven portion 516. Additionally, a pathway 550 may be formed between the first interwoven portion 516 and the second interwoven portion 526, where an interconnect 555 may be included within the pathway 550. When connected to the power source and ground, the interconnect 555 may operate as a heating element for the orthopedic precast 506 during the fitting and donning process for the orthosis.

According to this precast architecture, where the same thermoplastic material is utilized in the first interwoven portion 516 and the second interwoven portion 526, upon applying heat at or above the lower range of the melting point of the thermoplastic material by the interconnect 555, both the first interwoven portion 516 and the second interwoven portion 526 may experience a partial phase transition caused by partially melting of the thermoplastic material. During this partial phase transition, the thermoplastic material from both the first interwoven portion 516 and the second interwoven portion 526 may diffuse towards the pathway 550 and expand therefrom.

Given that the strand(s) 527 of the thermoplastic material within the second interweaving pattern 525 is (are) thicker than the strand(s) 517 of the thermoplastic material within the first interweaving pattern 515, during a melting process, a greater amount of thermoplastic material within the second interwoven portion 526 may be melted. As a result, after cooling, the second interwoven portion 526 may be formed as a shell portion with greater rigidity than a shell portion formed by the first interwoven portion 516. Hence, different types of strand thicknesses may be used to influence the rigidity of a resultant shell portion of an orthosis.

Figure 5D:
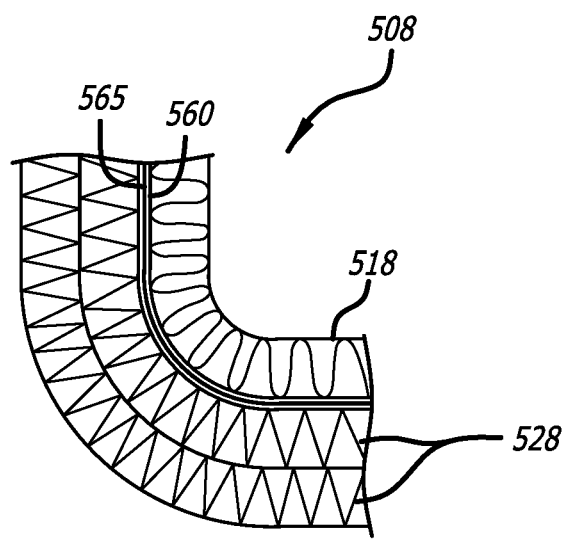
FIG. 5D is a cross-section view of an exemplary embodiment of a portion of an orthopedic precast having a first interwoven portion configured with a higher number of layers that include strands of a thermoplastic material than in a second interwoven portion.

Referring to FIG. 5D, an exemplary embodiment of an orthopedic precast 508 having a second interwoven portion 528 configured with a plurality of layers that include strands of a thermoplastic material, where the number of layers of the second interwoven portion 528 exceed a first interwoven portion 518. Additionally, a pathway 560 may be formed between the first interwoven portion 518 and the layers forming the second interwoven portion 528. An interconnect 565 may be included within the pathway 560. When connected to the power source and ground, the interconnect 565 may operate as a heating element for the orthopedic precast 508, notably as the precast 508 is worn by the patient in the creation of a customized orthosis.

According to this precast architecture, upon applying heat at or above the lower range of the melting point of the thermoplastic material by the interconnect 565, the second interwoven portion 528 would experience a phase transition caused by partially melting of the thermoplastic material. However, given this second interwoven portion 528 has a greater amount of thermoplastic material over a prescribed distance or area than the first interwoven portion 518 and the transfer of heat may be diminished as heat transfers into the first interwoven portion 518 via the second interwoven portion 528, the second interwoven portion 528 may experience a greater volume of melted thermoplastic material. As a result, after cooling, an inner portion of the second interwoven portion 528 would be formed as a shell portion with greater rigidity and the first interwoven portion 518, albeit the outer portion of the second interwoven portion 528 may not experience greater volumes of melting thermoplastic material due to the heat transfer from the interconnect 565 lessens as a distance from the interconnect 565 increases. Hence, multiple layers of thermoplastic material may be used to influence the rigidity of a resultant shell portion of an orthosis.

Figure 6A:
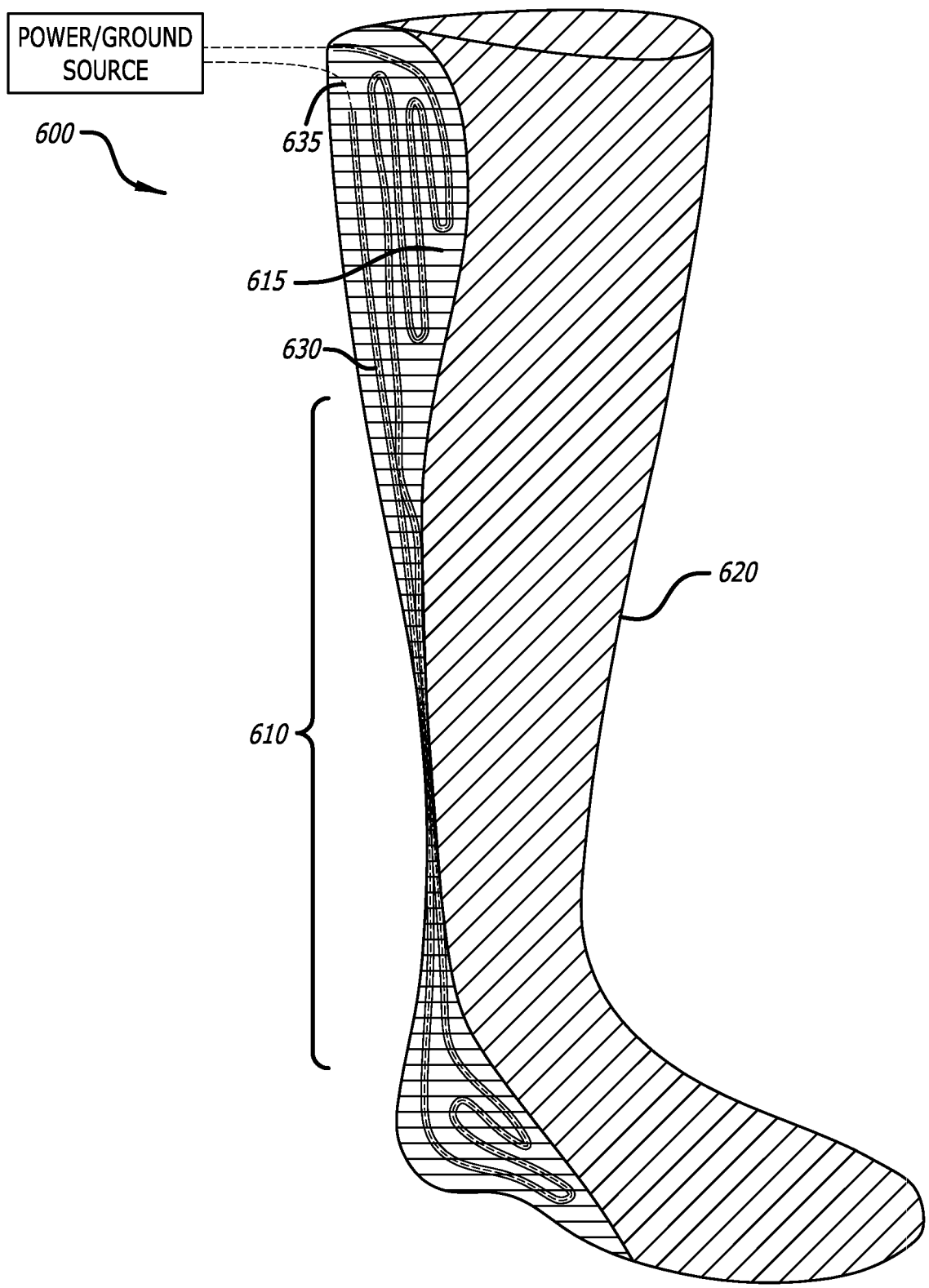
FIG. 6A is an exemplary embodiment of an orthopedic precast positioned about a patient's body part targeted to receive the orthosis (e.g., foot and ankle region).

Referring to FIG. 6A, an exemplary embodiment of an orthopedic precast 600 to be positioned about a patient's body part targeted to receive the orthosis (e.g., foot and ankle region) to illustrate that a first interwoven portion 610 is positioned along a posterior side to cover a heel, ankle, and Achilles tendon region of the patient. The first interwoven portion 610 includes a first thermoplastic material 615 with a first melting temperature while a second interwoven portion 620 merely includes non-thermoplastic material or a second thermoplastic material with a second melting temperature substantially greater than the first melting temperature. Pathways 630 may be formed within the precast 600 (e.g., pathways 630 with conductive interconnects 635 formed in the first interwoven portion 610).

Figure 6B:
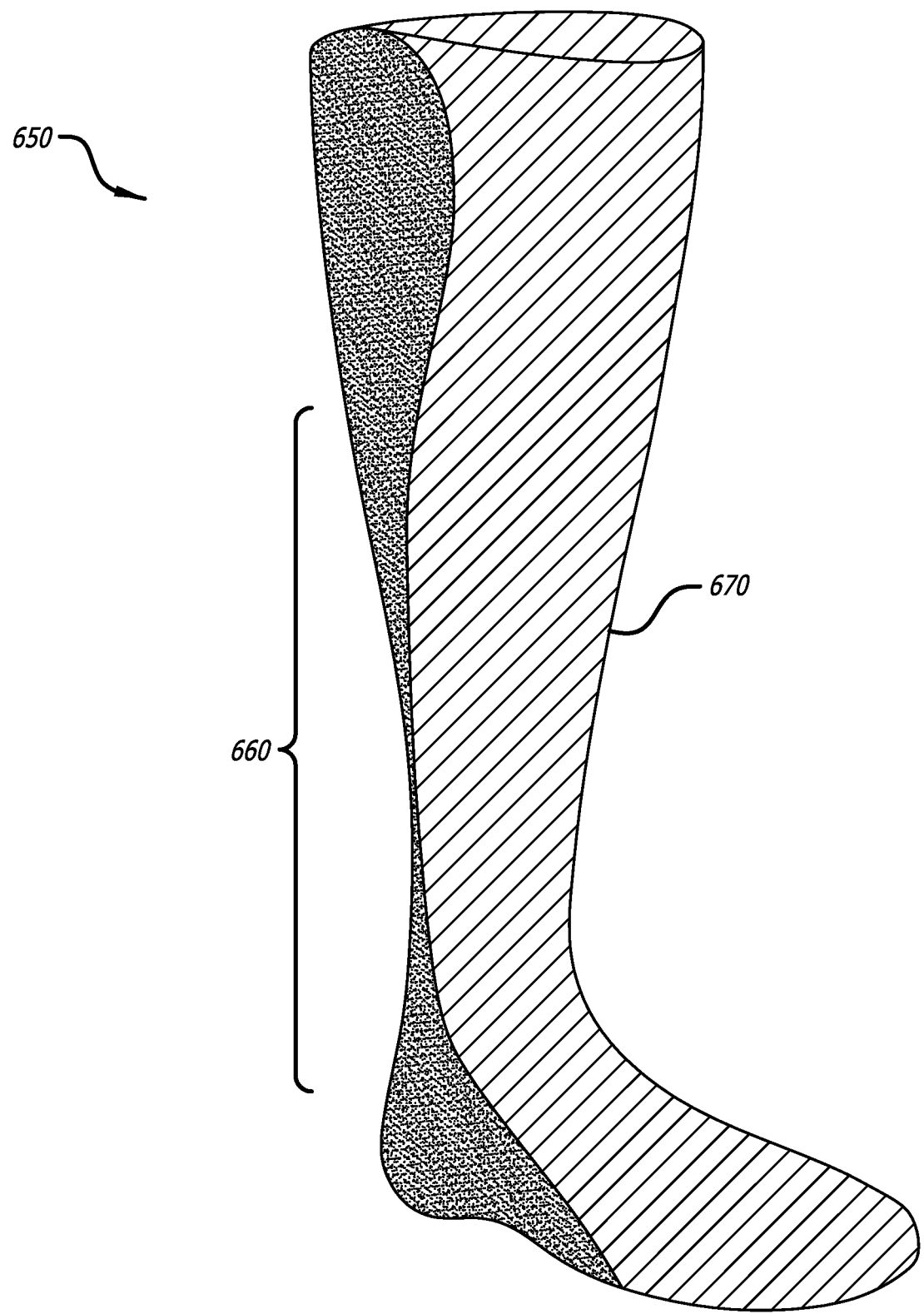
FIG. 6B is an exemplary embodiment of an orthosis created from the orthopedic precast of FIG. 6A.

As described above, there are a number of advantage of utilization of a patient in creation of an orthosis 650 of FIG. 6B. By allowing the orthopedic precast 600 to form along the patient's anatomical shape, considering specific relief areas of the patient (e.g., added or removed contours to relieve pressure caused by a bony prominence, added, or removed contours to better direct additional load to soft tissue area for enhanced comfort, etc.), the orthosis 650 may be better fitted to the patient. Also, by avoiding the use of molds, orthoses may be cheaper, quicker, and easier to fabricate.

As shown in more detail in FIGS. 6A-6B, the precast 600 is to be positioned about a foot, ankle, and calf regions of the patient. The precast 600 is heated using heating elements 635 integrated within the orthopedic precast 600 (e.g., interconnects 635 positioned within pathways 630 of the first interwoven portion 610) to a temperature at or above the lower range of the melting temperature of the first thermoplastic material. According to one embodiment, the heating occurs for the entire first interwoven portion 610. According to another embodiment, the heating may be "spot" heating to heat targeted areas of the first interwoven portion 610 more than others, where the interconnect 635 may be segmented and feature multiple power source connections to each interconnect segment. After the heating process, the precast 600 is cooled, which at least the first interwoven portion 610 partially rigidifies into a shell portion 660 while the second interwoven portion 620 retains its elasticity (or at least non-rigid nature) to form a flexible portion 670. As a result, the AFO orthosis 650 is produced.

Figure 7:
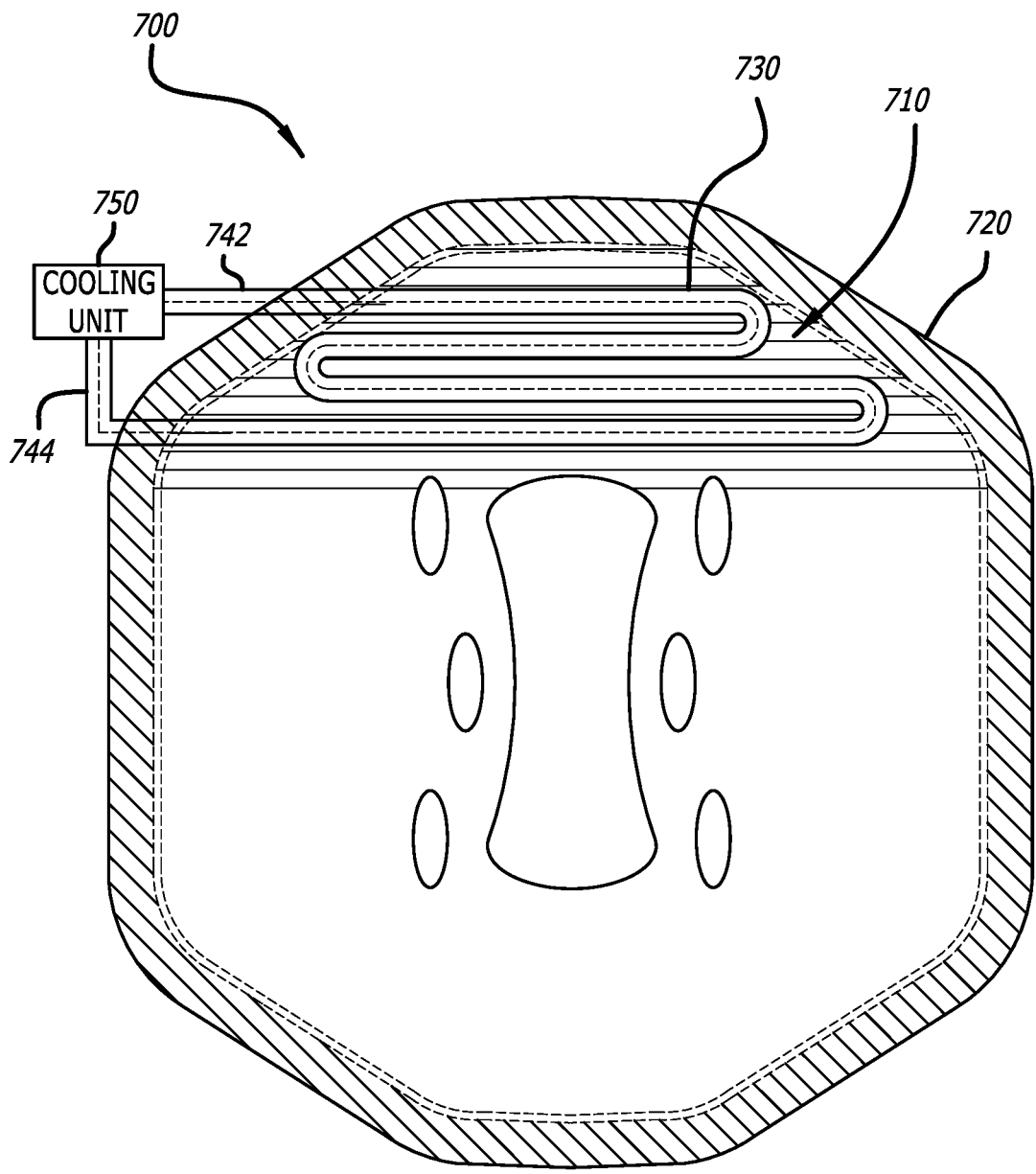
FIG. 7 is an exemplary embodiment of an orthopedic precast configured to operate as an orthosis with integrated pathways to support fluid flow.

These and other products may be formulated in accordance with selected positioning of interwoven portions with thermoplastic materials, heating, and subsequent cooling to achieve rigidity of these interwoven portions. For example, as shown in FIG. 7, an orthopedic precast 700 may be configured to operate as an orthosis with integrated pathways to support a flow of cooling fluid therethrough. The type of orthosis generated from the orthopedic precast 700, after heating to effectuate a phase (or state) transition for certain materials of the orthopedic precast 700, may include the following: (i) a back (or spinal) orthosis; a cervical orthosis; a knee orthosis, an ankle-foot orthosis (AFO), a torso orthosis, leg-ankle-foot orthosis, a wrist orthosis, a shoulder orthosis, or the like.

Herein, according to one embodiment of the disclosure, the orthopedic precast 700 features a first orthosis portion 710 including strands of thermoplastic material 720 interwoven in accordance with a prescribed interweaved pattern to create a continuous pathway 730 within the first orthosis portion 710. An interconnect 740, such as a plastic tubing from example, may be positioned within the pathway 730 with ends 742 and 744 of the interconnect 740 extending outward from the first orthosis portion 710. These ends 742 and 744 of the interconnect 740 may be coupled to a cooling unit 750, which circulates cooled solution (e.g., ice water, etc.) through the interconnect 740 to provide a cooling effect to a targeted body part of the patient (e.g., spinal region).

Upon heating of the first orthosis portion 710 at a temperature that exceeds a melting temperature of the thermoplastic material 720, the pathway 730 partially collapses to encase the interconnect 740. This encasement protects the interconnect 740 from environmental conditions, including puncture, twisting that may cause rupture, and other effects. Also, the propagation of the interconnect 740 within the first orthosis portion 710 and other portions of the resultant orthosis, when the material used in these portions has thermal transfer properties to apply cold temperatures to the targeted body part of the patient without a high degree of thermal loss. For this embodiment, the cooling may be applied through a shell portion formed from the first orthosis portion 710.

Figure 8A:
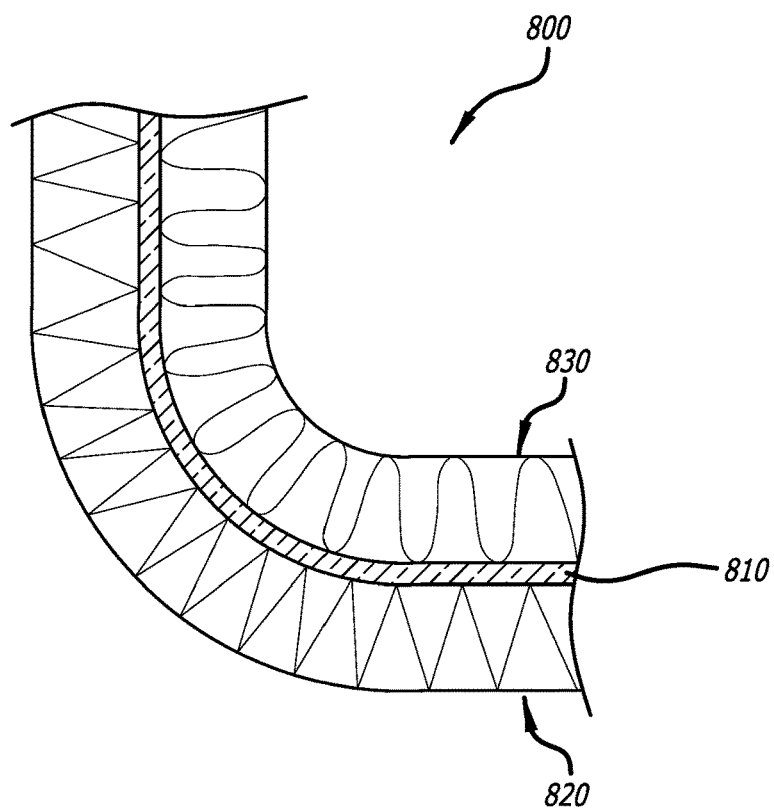
FIG. 8A is a cross-sectional view of an exemplary embodiment of an orthopedic precast illustrating a nonstick layer of material interposed between interwoven portions each corresponding to one or more layers of thermoplastic material.

Referring to FIG. 8A, a cross-sectional view of an exemplary embodiment of an orthopedic precast 800 illustrating a nonstick layer of material 810 interposed between a first interwoven portions 820 and a second interwoven portion 830, each corresponding to one or more layers of thermoplastic material. Herein, the nonstick layer 810 may include a high-density polyethylene material positioned between these interwoven portions 820 and 830.

As an illustrative example, the first interwoven portion 820 and the second interwoven portion 830 may be arranged as part of a single layer construction with a non-stick portion of material laterally layered and interposed between these interwoven portions. Alternatively, the first interwoven portion 820 and the second interwoven portion 830 may be vertically layered on each other with the nonstick layer 810 interposed between these interwoven portions 820 and 830, as shown in FIG. 8A.

Both of these layering schemes (lateral & vertical) enable movement of the first interwoven portion 820 or the second interwoven portion 830 without requisite movement of the other interwoven portion. Stated differently, the nonstick layer of material 810 allows one layered interwoven portion (e.g., the second interwoven portion 830) to remain static while the other layered interwoven portion (e.g., the first interwoven portion 820) undergoes movement. Herein, the first interwoven portion 820 and the second interwoven portion 830 may utilize different materials and/or different interweaving techniques to provide greater rigidity, maintain a flexible and/or elastic construction, or the like.

When heat is directed from a thermal unit 850 towards the first interwoven portion 820 formed with strands of a first thermoplastic material 840 and the directed heat reaches or exceeds a prescribed thermal threshold at or exceeding a melting temperature of the first thermoplastic material 840, the first interwoven portion 820 experiences a phase transition (i.e., a phase change). This phase change may involve a partial melting and subsequent cooling of the first thermoplastic material 840. During this phase change, the first interwoven portion 820 transitions from a flexible material to a rigid material (referred to as a "shell portion"), which partially forms a resultant orthosis.

Herein, different interwoven portions may experience different degrees of phase change, depending on their material composition, structure, and the amount of heat transferred to the interwoven portion. The varying degrees of phase change could allow for different regions of the resultant orthosis to be configured with different levels of rigidity (e.g., extremely rigid, semi-rigid, flexible, etc.). The heat may be applied through heated air flow or applying heated steam (i.e., combination of heat and water vapor).

Figure 8B:
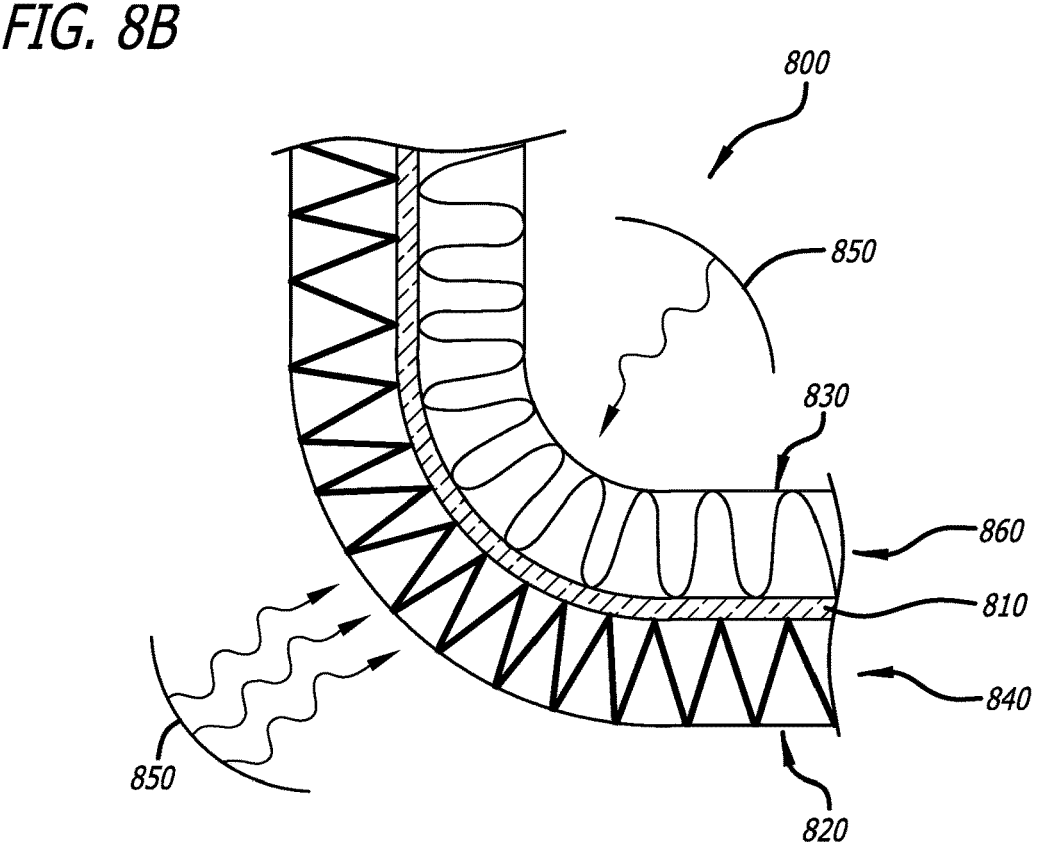
FIG. 8B is a cross-sectional view of an exemplary embodiment of the orthopedic precast of FIG. 8A, in which the interwoven portions are heated.

For instance, the second interwoven portion 830 may be configured with strands of the first thermoplastic material 860, similar to the strands 840 of the first interwoven portion, but in lesser quantity (e.g., lesser strand numbers, thinner thermoplastic strands, lesser weight, lesser volume of thermoplastic strands due to interweaving/stitching pattern, etc.). After applying heat at or exceeding the melting temperature of the first thermoplastic material 840/860 as shown in FIG. 8B, both the first and second interwoven portions 820 and 830 may undergo a phase change. However, the first interwoven portion 820 may conform to a more rigid material than the second interwoven portion 830, as the greater quantity of the first thermoplastic material 840 may result in greater rigidity after cooling. The nonstick layer 810 may allow for independent movement of the rigid (shell) portion formed by the first interwoven portion 820 without causing movement of the second interwoven portion 830.

It should be apparent to those skilled in the art that many more modifications besides those already described are possible without departing from the inventive concepts herein. The inventive subject matter, therefore, is not to be restricted except in the spirit of the appended claims. For example, in lieu of its use in molding the orthosis, the interconnects may be powered to produce a lower temperature (e.g., 45-70° C. to warm region of the body. However, at lower temperatures the current concept could be deployed to warm regions (under/integrated into the shell portion) for comfort such as the knee joint space in the case of knee osteoarthritis or over a sore muscle such as calf.

Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

What is claimed is:

1. An orthopedic precast, comprising:
   a first portion comprising interwoven strands of a first thermoplastic material having a first melting temperature, the interwoven strands of the first thermoplastic material forming a pathway within the first portion; and
   an interconnect positioned within the pathway, wherein the interconnect is configured to receive power and radiate heat based on current flowing through the interconnect, wherein
   responsive to the interconnect being configured to provide heat of at least the first melting temperature, the first thermoplastic material being partially melted and, upon subsequent cooling, the first portion transitions from a flexible state to a rigid state to form an orthosis with a rigid area corresponding to at least part of the first portion of the orthopedic precast.

2. The orthopedic precast of claim 1 further comprising a second portion comprising interwoven strands of non-thermoplastic material that are coupled to the interwoven strands of the first thermoplastic material, wherein the second portion remains in a flexible state independent of the first portion transitioning from the flexible state to the rigid state.

3. The orthopedic precast of claim 1, wherein the interwoven strands of the first thermoplastic material are interweaved in accordance with an interwoven pattern to create the first portion being layers of material that, upon heating above the first melting temperature, form a back orthosis.

4. The orthopedic precast of claim 1, wherein the first portion being positioned adjacent to a body part of a patient to conform in structure to the body part when the first thermoplastic material is in a partially melted state.

5. The orthopedic precast of claim 1, wherein the first portion further comprises a second plurality of interwoven strands of a second thermoplastic material forming at least part of the pathway and positioned closer to a top surface of the first portion than the interconnect, the second thermoplastic material having a second melting temperature less than or equal to the first melting temperature.

6. The orthopedic precast of claim 5, wherein the second thermoplastic material being partially melted and covering the interconnect, the second thermoplastic material having a greater level of rigidity than the first thermoplastic material after transition from the flexible state to the rigid state.

7. The orthopedic precast of claim 1, wherein the interconnect includes one or more strands of conductive material.

8. The orthopedic precast of claim 1, wherein the interconnect provides providing heat upon coupling the interconnect to a power source.

9. An orthopedic precast, comprising:
   a first portion comprising interwoven strands of a first thermoplastic material having a first melting temperature, the interwoven strands of the first thermoplastic material forming a pathway within the first portion; and
   an interconnect positioned within the pathway, wherein the interconnect is configured to provide a conduit for a fluid propagating through the first portion, wherein
   responsive to an application of heat of at least the first melting temperature to the first portion, the first thermoplastic material being partially melted, diffuse to encase the interconnect, and, upon subsequent cooling, the first portion transitions from a flexible state to a rigid state.

10. The orthopedic precast of claim 9 transitions to an orthosis upon the first portion transitioning from the flexible state to the rigid state.

11. The orthopedic precast of claim 9, wherein the interconnect includes a plastic tubing positioned within the pathway with a first end and a second end of the interconnect extending outward from the first portion.

12. The orthopedic precast of claim 11, wherein the first end and the second end of the interconnect are coupled to a cooling unit, the cooling unit is configured to circulate a solution into the first end of the interconnect and receive the solution from the second end of the interconnect.

13. The orthopedic precast of claim 9, wherein the interwoven strands of the first thermoplastic material are interweaved in accordance with an interwoven pattern to create the first portion being layers of material that, upon heating above the first melting temperature, form a portion of a back orthosis.

14. The orthopedic precast of claim 9, wherein the first portion further comprises interwoven strands of a second thermoplastic material forming at least part of the pathway and positioned closer to a top surface of the first portion than the interconnect, the second thermoplastic material having a second melting temperature less than or equal to the first melting temperature.

15. The orthopedic precast of claim 14, wherein the interwoven strands of the second thermoplastic material being partially melted to cover the interconnect where a first area of an orthosis formed by the interwoven strands of the second thermoplastic material has a greater level of rigidity than a second area of the orthosis formed by the interwoven strands of the first thermoplastic material after transition from the flexible state to the rigid state.

16. The orthopedic precast of claim 15, wherein the interwoven strands of the second thermoplastic material features a greater volume of thermoplastic material than the interwoven strands of the first thermoplastic material.

17. A method, comprising:
   interweaving strands of a first thermoplastic material having a first melting temperature to form a pathway within a first portion of an orthopedic precast; and
   positioning an interconnect within the pathway;
   connecting the interconnect to a power source, wherein the interconnect is configured to receive power and radiate heat based on electrical current flowing through the interconnect;
   partially melting the strands of the first thermoplastic material upon the heat provided by the interconnect reaching or exceeding the first melting temperature, wherein the partially melted strands of the first thermoplastic material encapsulating the interconnect; and
   cooling the first portion of the orthopedic precast so that the first portion transitions from a flexible state to a rigid state to form an orthosis with a rigid area correspond to at least part of the first portion of the orthopedic precast.

18. The method of claim 17, wherein prior to connecting the interconnect to a power source, the method further comprising
   interweaving strands of a prescribed material formed within a second portion of the orthopedic precast with one or more strands from the strands of the first thermoplastic material, wherein the second portion remains in a flexible state independent of the first portion transitioning from the flexible state to the rigid state.

19. The method of claim 18, wherein the strands of the prescribed material are interwoven strands of a second thermoplastic material having a melting temperature substantially greater than the first melting temperature and the heat provided by the interconnect is unable to reach or exceed the melting temperature of the second thermoplastic material.

20. The method of claim 18, wherein the strands of the prescribed material are interwoven strands of a non-thermoplastic material so that the heat provided by the interconnect is unable to reach or exceed a melting temperature of the non-thermoplastic material.

\* \* \* \* \*